US007520726B2

(12) United States Patent
Papple et al.

(10) Patent No.: US 7,520,726 B2
(45) Date of Patent: Apr. 21, 2009

(54) HP TURBINE BLADE AIRFOIL PROFILE

(75) Inventors: Michael Papple, Ile des Soeurs (CA); Edward Vlasic, Beaconsfield (CA); Sami Girgis, Montréal (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 404 days.

(21) Appl. No.: 11/516,598

(22) Filed: Sep. 7, 2006

(65) Prior Publication Data

US 2008/0063530 A1 Mar. 13, 2008

(51) Int. Cl.
*B64C 27/46* (2006.01)

(52) U.S. Cl. .............................. 416/223 R; 416/223 A; 416/246

(58) Field of Classification Search ............. 416/223 R, 416/243

See application file for complete search history.

(56) References Cited

U.S. PATENT DOCUMENTS 6,398,489 B1 6/2002 Burdgick et al.
6,832,897 B2 12/2004 Urban
6,854,961 B2 2/2005 Zhang et al.
6,910,868 B2 6/2005 Hyde et al.
7,354,249 B2 * 4/2008 Girgis et al. ............ 416/223 A
2005/0079061 A1 4/2005 Beddard et al.
2008/0044287 A1 * 2/2008 Girgis et al.
2008/0056896 A1 * 3/2008 Trindade et al. ......... 415/208.1

OTHER PUBLICATIONS

U.S. Appl. No. 11/366,018, filed Mar. 2, 2006, Girgis et al.
U.S. Appl. No. 11/366,025, filed Mar. 2, 2006, Girgis et al.
U.S. Appl. No. 11/366,020, filed Mar. 2, 2006, Girgis et al.
U.S. Appl. No. 11/366,015, filed Mar. 2, 2006, Girgis et al.
U.S. Appl. No. 11/366,026, filed Mar. 2, 2006, Girgis et al.

* cited by examiner

*Primary Examiner*—Edward Look
*Assistant Examiner*—Aaron R Eastman
(74) *Attorney, Agent, or Firm*—Ogilvy Renault LLP

(57) ABSTRACT

A first stage blade of a two-stage high pressure turbine includes an airfoil having a profile substantially in accordance with at least an intermediate portion of the Cartesian coordinate values of X, Y and Z set forth in Table 2. The X and Y values are distances, which when smoothly connected by an appropriate continuing curve, define airfoil profile sections at each distance Z. The profile sections at each distance Z are joined smoothly to one another to form a complete airfoil shape.

15 Claims, 3 Drawing Sheets

HP TURBINE BLADE AIRFOIL PROFILE

TECHNICAL FIELD

The invention relates generally to a blade airfoil for a gas turbine engine and, more particularly, to an airfoil profile suited for use in the first stage rotor assembly of a two-stage high pressure turbine.

BACKGROUND OF THE ART

Where a blade airfoil is part of a two-stage turbine driving a compressor (i.e. part of a high pressure or HP turbine), the requirements for such a blade airfoil design are significantly more stringent than multiple stage airfoil designs, as the compressor relies solely on two stages to deliver all the required work, as opposed to work being spread over several turbine stages. Over and above this, the airfoil is subject to flow regimes which lend themselves easily to flow separation, which tend to limit the amount of work transferred to the compressor, and hence the total thrust or power capability of the engine. The HP turbine is also subject to harsh temperatures and pressures, which require a trade-off compromise between aerodynamic and structural optimization.

SUMMARY OF INVENTION

It is therefore an object of this invention to provide an improved blade airfoil for a two-stage high pressure turbine.

In one aspect, the present invention provides a turbine blade for a gas turbine engine comprising an airfoil having an intermediate portion defined by a nominal profile substantially in accordance with Cartesian coordinate values of X, Y, and Z of Sections 2 to 8 set forth in Table 2, wherein the point of origin of the orthogonally related axes X, Y and Z is located at an intersection of a centerline of the gas turbine engine and a stacking line of the turbine blade, the Z values are radial distances measured along the stacking line, the X and Y are coordinate values defining the profile at each distance Z.

In another aspect, the present invention provides a turbine blade for a gas turbine engine comprising an airfoil having an intermediate portion at least partly defined by a nominal profile substantially in accordance with Cartesian coordinate values of X, Y, and Z of Sections 2 to 8 set forth in Table 2, wherein the point of origin of the orthogonally related axes X, Y and Z is located at an intersection of a centerline of the gas turbine engine and a stacking line of the turbine blade in the engine, the Z values are radial distances measured along the stacking line of the airfoil, the X and Y are coordinate values defining the profile at each distance Z, and wherein the X and Y values are scalable as a function of the same constant or number.

In another aspect, the present invention provides a turbine rotor for a gas turbine engine comprising a plurality of blades extending from a rotor disc, each blade including an airfoil having an intermediate portion defined by a nominal profile substantially in accordance with Cartesian coordinate values of X, Y, and Z of Sections 2 to 8 set forth in Table 2, wherein the point of origin of the orthogonally related axes X, Y and Z is located at an intersection of a centerline of the gas turbine engine and a stacking line of the blades, the Z values are radial distances measured along the stacking line, the X and Y are coordinate values defining the profile at each distance Z.

In accordance with a still further general aspect of the present invention, there is provided a high pressure turbine blade located at a stacking line in a gaspath, comprising an airfoil having a surface lying substantially on the points of Table 2, the airfoil extending between a platform and a tip, the platform being generally defined by the inner gaspath of Table 1, and wherein the tip is defined to provide a blade tip clearance with the outer gaspath defined in Table 1 at said stacking line.

The profile shape of the present invention provides maximum work for a two-stage high pressure turbine, while minimizing flow separation disadvantages in such an environment. The design reduces radial static pressure distribution in blade channel to decrease secondary flow losses. To accomplish this, advanced 3D optimization techniques are used. The first stage airfoil exit aerodynamic profiles are optimized for a two-stage high pressure turbine whose work split is also optimized by the present design. The airfoil tip section profile is designed to reduce tip leakage loss.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
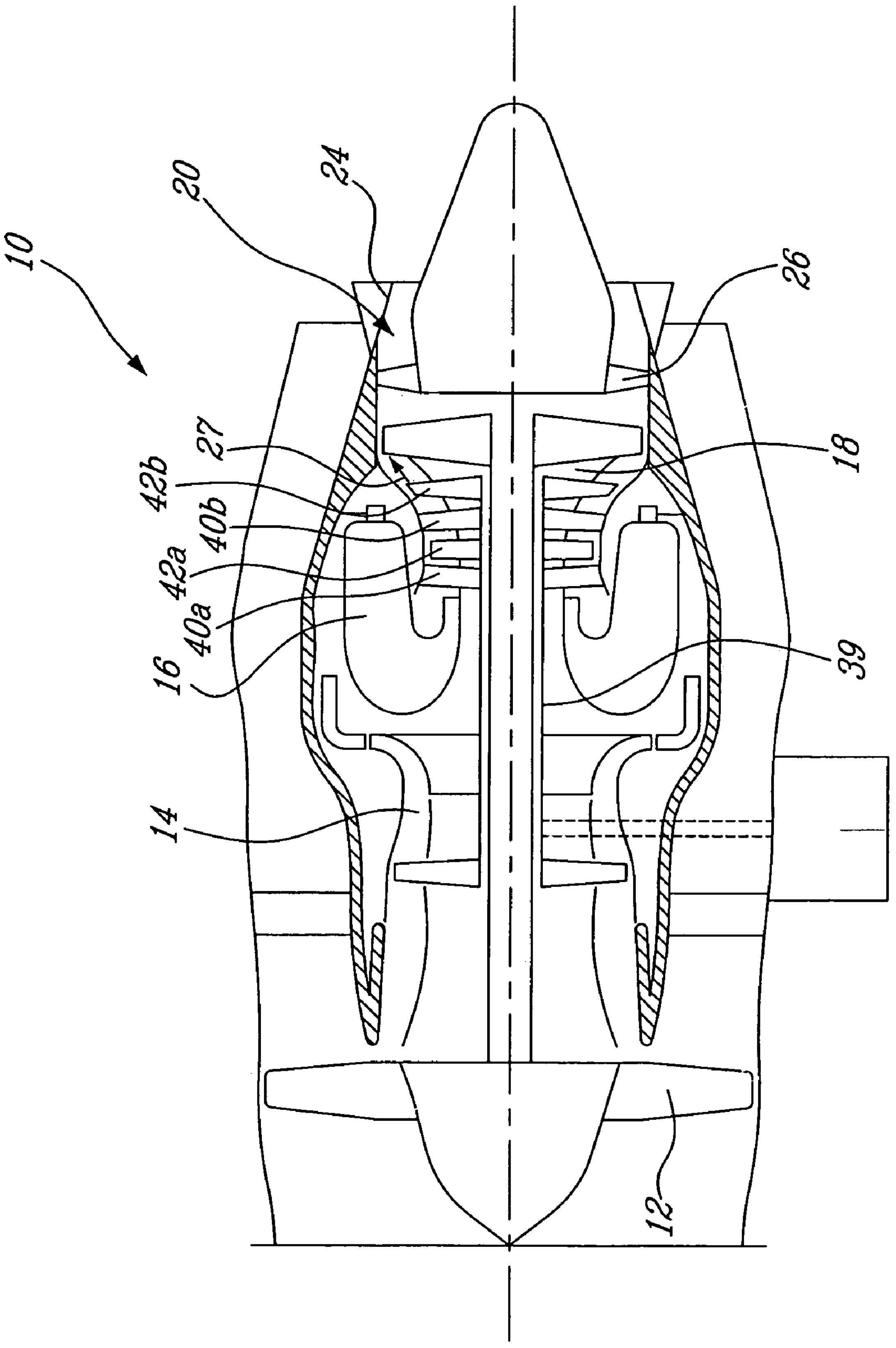
FIG. 1 is a schematic view of a gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases to drive the fan, the compressor, and produce thrust.

The gas turbine engine 10 further includes a turbine exhaust duct 20 which is exemplified as including an annular core portion 22 and an annular outer portion 24 and a plurality of struts 26 circumferentially spaced apart, and radially extending between the inner and outer portions 22, 24.

Figure 2:
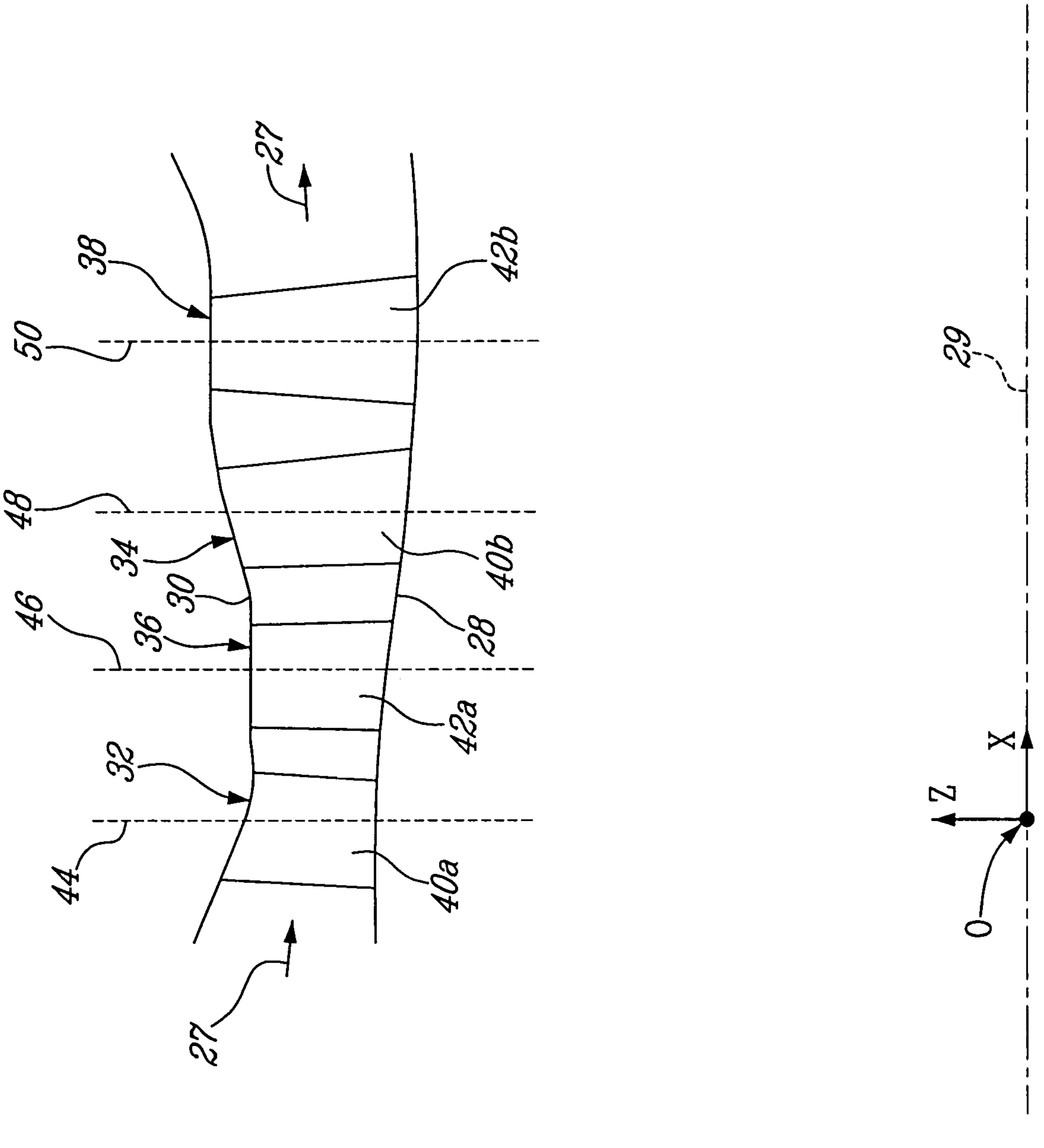
FIG. 2 is a schematic view of a gaspath of the gas turbine engine of FIG. 1, including a two-stage high pressure turbine.

FIG. 2 illustrates a portion of an annular hot gaspath, indicated by arrows 27 and defined by annular inner and outer walls 28 and 30 respectively, for directing the stream of hot combustion gases axially in an annular flow. The profile of the inner and outer walls 28 and 30 of the annular gaspath, "cold" (i.e. non-operating) conditions, is defined by the Cartesian coordinate values on Table 1 below. More particularly, the inner and outer gaspath walls 28 and 30 are defined with respect to mutually orthogonal x and z axes, as shown in FIG. 2. The x axis corresponds to the engine turbine rotor centerline 29. The radial distance of the inner and outer walls 28 and 30 from the engine turbine rotor centerline and, thus, from the x-axis at specific axial locations is measured along the z axis. The z values provide the inner and outer radius of the gas path at various axial locations therealong. The x and z coordinate values in Table 1 are distances given in inches from the point of origin O (See FIG. 2). It is understood that other units of dimensions may be used. The x and z values have in average a manufacturing tolerance of about ±0.010 inch. It is understood that the manufacturing tolerances of the gas path may vary along the length thereof.

The turbine section 18 has a first high pressure turbine (HPT) stage located downstream of the combustor 16 and a second HPT stage located further downstream in the gaspath 27. Referring to FIG. 2, the two HPT stages are preferably transonic and comprise respective first and second stator assemblies 32, 34 and respective first and second rotor assemblies 36, 38 having a plurality of circumferentially spaced vanes 40*a*, 40*b* and blades 42*a*, 42*b* respectively. The vanes 40*a,b* and blades 42*a,b* are mounted in position along respective stacking lines 44-50, as identified in FIG. 2. The stacking lines 44-50 extend in the radial direction along the z axis at different axial locations. The stacking lines 44-50 define the axial location where the vanes 40*a.b* and the blades 42*a,b* of each stage are mounted in the engine 10. More specifically, stacking line 44 located at x=0 corresponds to the first stage HPT vanes 40*a*, referred to as VANE 1 in Table 1. Stacking line 46 located at x=1.240 corresponds to the first stage HPT blades 42*a*, referred to as BLADE 1 in Table 1. Stacking line 48 located at x=2.56 corresponds to the second stage HPT vanes 40*b*, referred to as VANE 2 in Table 1. Stacking line 50 located at x=3.980 corresponds to the second stage HPT blades 50, referred to as BLADE 2 in Table 1.

TABLE 1

COLD GASPATH DEFINITION

| INNER GASPATH X | INNER GASPATH Z | | OUTER GASPATH X | OUTER GASPATH Z |
|---|---|---|---|---|
| −0.6 | 5.975 | | −0.6 | 7.129 |
| −0.385 | 5.975 | | −0.385 | 7.055 |
| 0 | 5.975 | VANE 1 | 0 | 6.922 |
| 0.127 | 5.975 | | 0.127 | 6.883 |
| 0.281 | 5.974 | | 0.281 | 6.856 |
| 0.468 | 5.961 | | 0.468 | 6.847 |
| 0.699 | 5.94 | | 0.699 | 6.901 |
| 1.076 | 5.904 | | 1.076 | 6.901 |
| 1.24 | 5.888 | BLADE 1 | 1.24 | 6.901 |
| 1.656 | 5.837 | | 1.656 | 6.901 |
| 1.871 | 5.814 | | 1.871 | 6.93 |
| 2.301 | 5.788 | | 2.301 | 7.015 |
| 2.56 | 5.784 | VANE 2 | 2.56 | 7.08 |
| 2.768 | 5.771 | | 2.768 | 7.128 |
| 3.15 | 5.757 | | 3.15 | 7.17 |
| 3.25 | 5.75 | | 3.25 | 7.201 |
| 3.446 | 5.737 | | 3.446 | 7.201 |
| 3.73 | 5.672 | | 3.73 | 7.201 |
| 3.98 | 5.763 | BLADE 2 | 3.98 | 7.201 |
| 4.225 | 5.673 | | 4.225 | 7.201 |
| 4.461 | 5.673 | | 4.461 | 7.201 |
| 4.717 | 5.676 | | 4.717 | 7.222 |
| 5 | 5.688 | | 5 | 7.281 |
| 5.444 | 5.721 | | 5.444 | 7.433 |

More specifically, the first and second stage rotor assemblies 36, 38 each include a disc drivingly mounted to shaft 39 (see FIG. 1). Each disc carries at its periphery the plurality of circumferentially distributed blades 42*a,b* that extend radially outwardly into the gaspath 27. The first HPT stage includes 32 vanes and 44 blades, the second HPT stage include 48 vanes and 46 blades.

Figure 3:
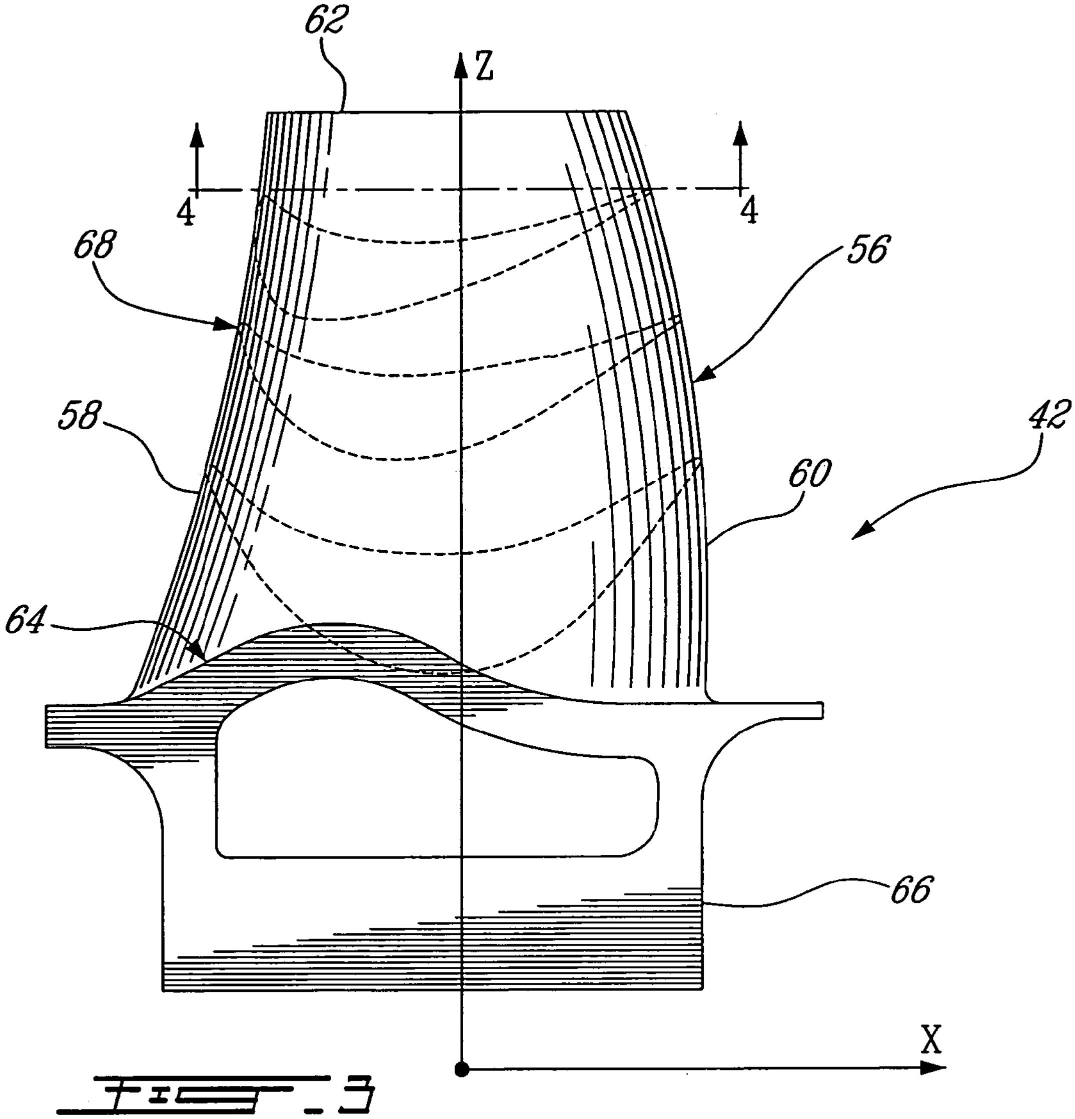
FIG. 3 is a schematic elevation view of a first stage high pressure turbine blade having a blade profile defined in accordance with an embodiment of the present invention.
Figure 4:
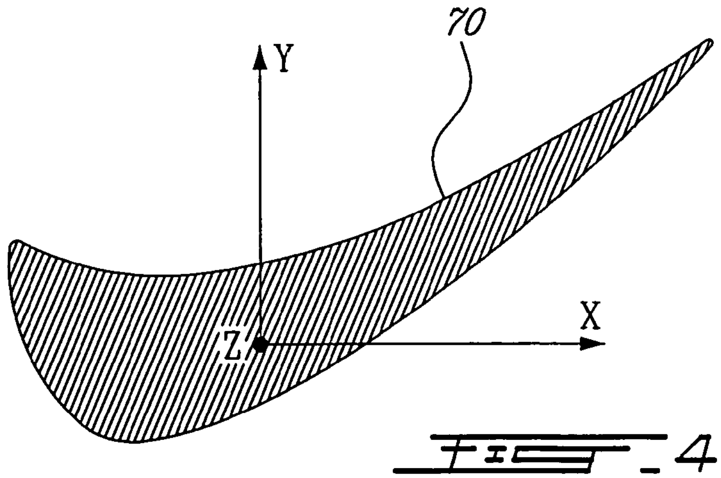
FIG. 4 is a cross sectional view taken along lines 4-4 of FIG. 3, showing a representative profile section of the airfoil portion of the blade.

FIG. 3 shows an example of a first stage HPT blade 42*a*. It can be seen that each blade 42*a* has an airfoil 56 having a leading edge 58, a trailing edge 60 and a tip 62. The airfoil 56 extends from a platform 64 provided at the upper end of a root portion 66. The root portion 66 is adapted to be captively received in a complementary blade attachment slot (not shown) defined in the outer periphery of the disc such that it resists axial and centrifugal dislodgement of the blade 42*a*.

The novel airfoil shape of each first stage HPT blade 42*a* is a set of X-Y-Z points in space. This set of points represents a novel and unique solution to the target design criteria discussed above, and is well-adapted for use in a two-stage HPT design. The set of points are defined in a Cartesian coordinate system which has mutually orthogonal X, Y and Z axes. The X axis extends axially along the turbine rotor centerline 29 i.e., the rotary axis. The positive X direction is axially towards the aft of the turbine engine 10. The Z axis extends along the first HPT blade stacking line 46 of each respective blade 42*a* in a generally radial direction and intersects the X axis at the center of rotation of the rotor assembly 36. The positive Z direction is radially outwardly toward the blade tip 62. The Y axis extends tangentially with the positive Y direction being in the direction of rotation of the first rotor assembly 36. Therefore, the origin of the X, Y and Z axes is defined at the point of intersection of all three orthogonally-related axes: that is the point (0,0,0) at the intersection of the center of rotation of the turbine engine 10 and the stacking line 46.

In a particular embodiment of the first HPT stage, the set of points which define the HPT stage blade airfoil profile relative to the axis of rotation of the turbine engine 10 and the stacking line 46 thereof are set out in Table 2 below as X, Y and Z Cartesian coordinate values. Particularly, the blade airfoil profile is defined by profile sections 70 at various locations along its height, the locations represented by Z values. It should be understood that the Z values do not represent an actual radial height along the airfoil 56 but are defined with respect to the engine center line. For example, if the blades 42*a* are mounted about the rotor assembly 36 at an angle with respect to the radial direction, then the Z values are not a true representation of the height of the airfoils of the blades 42*a*. Furthermore, it is to be appreciated that, with respect to Table 2, Z values are not actually radial heights, per se, from the centerline but rather a height from a plane through the centerline—i.e. the sections in Table 2 are planar. The coordinate values are set forth in inches in Table 2 although other units of dimensions may be used when the values are appropriately converted.

Thus, at each Z distance, the X and Y coordinate values of the desired profile section 70 are defined at selected locations in a Z direction normal to the X, Y plane. The X and Y coordinates are given in distance dimensions, e.g., units of inches, and are joined smoothly, using appropriate curve-fitting techniques, at each Z location to form a continuous airfoil cross-section. The blade airfoil profiles of the various surface locations between the distances Z are determined by smoothly connecting the adjacent profile sections 70 to one another to form the airfoil profile.

The coordinate values listed in Table 2 below represent the desired airfoil profiles in a "cold" (i.e. non-operating) condition. However, the manufactured airfoil surface profile will be slightly different as a result of manufacturing and applied coating tolerances. The coordinate values listed in Table 2 below are for an uncoated airfoil. According to an embodiment of the present invention, the finished HPT blades are coated for thermal protection.

The Table 2 values are generated and shown to three decimal places for determining the profile of the HPT stage blade airfoil. However, as mentioned above, there are manufacturing tolerance issues, as well as coating thicknesses, which must be accounted for and, accordingly, the values for the profile given in Table 2 are for a theoretical airfoil. The blade is manufactured such that is surface falls within 0.010 inch of the coordinates. In addition to the manufacturing tolerances, a coating having a thickness of 0.002 inch to 0.010 inch is typically applied to the uncoated blade airfoil defined in Table 2. The HPT stage blade airfoil design functions well within these ranges. The cold or room temperature profile is given by the X, Y and Z coordinates for manufacturing purposes. It is understood that the airfoil may deform, within acceptable limits, once entering service.

The coordinate values given in Table 2 below provide the preferred nominal first stage HPT blade airfoil profile.

TABLE 2

| | X | Y | Z |
|---|---|---|---|
| SECTION 1 | −0.507 | 0.059 | 5.729 |
| | −0.506 | 0.063 | 5.729 |
| | −0.505 | 0.066 | 5.729 |
| | −0.503 | 0.070 | 5.729 |
| | −0.502 | 0.073 | 5.729 |
| | −0.501 | 0.077 | 5.729 |
| | −0.499 | 0.080 | 5.729 |
| | −0.498 | 0.083 | 5.729 |
| | −0.497 | 0.087 | 5.729 |
| | −0.495 | 0.090 | 5.729 |
| | −0.494 | 0.094 | 5.729 |
| | −0.487 | 0.111 | 5.729 |
| | −0.479 | 0.128 | 5.729 |
| | −0.471 | 0.144 | 5.729 |
| | −0.462 | 0.160 | 5.729 |
| | −0.453 | 0.176 | 5.729 |
| | −0.442 | 0.192 | 5.729 |
| | −0.432 | 0.207 | 5.729 |
| | −0.420 | 0.221 | 5.729 |
| | −0.408 | 0.235 | 5.729 |
| | −0.395 | 0.248 | 5.729 |
| | −0.381 | 0.260 | 5.729 |
| | −0.366 | 0.272 | 5.729 |
| | −0.351 | 0.282 | 5.729 |
| | −0.335 | 0.291 | 5.729 |
| | −0.319 | 0.300 | 5.729 |
| | −0.302 | 0.307 | 5.729 |
| | −0.284 | 0.313 | 5.729 |
| | −0.267 | 0.318 | 5.729 |
| | −0.249 | 0.322 | 5.729 |
| | −0.230 | 0.324 | 5.729 |
| | −0.212 | 0.325 | 5.729 |
| | −0.193 | 0.325 | 5.729 |
| | −0.175 | 0.324 | 5.729 |
| | −0.157 | 0.321 | 5.729 |
| | −0.139 | 0.318 | 5.729 |
| | −0.121 | 0.313 | 5.729 |
| | −0.103 | 0.307 | 5.729 |
| | −0.086 | 0.300 | 5.729 |
| | −0.069 | 0.292 | 5.729 |
| | −0.053 | 0.284 | 5.729 |
| | −0.037 | 0.274 | 5.729 |
| | −0.022 | 0.264 | 5.729 |
| | −0.007 | 0.253 | 5.729 |
| | 0.008 | 0.242 | 5.729 |
| | 0.022 | 0.230 | 5.729 |
| | 0.036 | 0.218 | 5.729 |
| | 0.049 | 0.205 | 5.729 |
| | 0.062 | 0.192 | 5.729 |
| | 0.075 | 0.179 | 5.729 |
| | 0.088 | 0.165 | 5.729 |
| | 0.100 | 0.151 | 5.729 |
| | 0.112 | 0.137 | 5.729 |
| | 0.124 | 0.123 | 5.729 |
| | 0.136 | 0.109 | 5.729 |
| | 0.147 | 0.095 | 5.729 |
| | 0.158 | 0.080 | 5.729 |
| | 0.170 | 0.065 | 5.729 |
| | 0.180 | 0.050 | 5.729 |
| | 0.191 | 0.035 | 5.729 |
| | 0.202 | 0.020 | 5.729 |
| | 0.212 | 0.005 | 5.729 |
| | 0.222 | −0.011 | 5.729 |
| | 0.232 | −0.026 | 5.729 |

TABLE 2-continued

| X | Y | Z |
|---|---|---|
| 0.242 | −0.042 | 5.729 |
| 0.252 | −0.057 | 5.729 |
| 0.261 | −0.073 | 5.729 |
| 0.271 | −0.089 | 5.729 |
| 0.280 | −0.105 | 5.729 |
| 0.289 | −0.122 | 5.729 |
| 0.297 | −0.138 | 5.729 |
| 0.306 | −0.154 | 5.729 |
| 0.314 | −0.171 | 5.729 |
| 0.322 | −0.188 | 5.729 |
| 0.330 | −0.204 | 5.729 |
| 0.337 | −0.221 | 5.729 |
| 0.344 | −0.238 | 5.729 |
| 0.351 | −0.255 | 5.729 |
| 0.358 | −0.273 | 5.729 |
| 0.364 | −0.290 | 5.729 |
| 0.370 | −0.308 | 5.729 |
| 0.376 | −0.325 | 5.729 |
| 0.381 | −0.343 | 5.729 |
| 0.386 | −0.361 | 5.729 |
| 0.391 | −0.378 | 5.729 |
| 0.395 | −0.396 | 5.729 |
| 0.399 | −0.414 | 5.729 |
| 0.402 | −0.433 | 5.729 |
| 0.406 | −0.451 | 5.729 |
| 0.408 | −0.469 | 5.729 |
| 0.409 | −0.473 | 5.729 |
| 0.410 | −0.476 | 5.729 |
| 0.410 | −0.480 | 5.729 |
| 0.410 | −0.484 | 5.729 |
| 0.411 | −0.487 | 5.729 |
| 0.411 | −0.491 | 5.729 |
| 0.412 | −0.495 | 5.729 |
| 0.412 | −0.498 | 5.729 |
| 0.413 | −0.502 | 5.729 |
| 0.413 | −0.506 | 5.729 |
| 0.413 | −0.510 | 5.729 |
| 0.413 | −0.514 | 5.729 |
| 0.412 | −0.518 | 5.729 |
| 0.410 | −0.522 | 5.729 |
| 0.408 | −0.525 | 5.729 |
| 0.406 | −0.529 | 5.729 |
| 0.403 | −0.532 | 5.729 |
| 0.399 | −0.534 | 5.729 |
| 0.396 | −0.536 | 5.729 |
| 0.392 | −0.537 | 5.729 |
| 0.387 | −0.538 | 5.729 |
| 0.383 | −0.538 | 5.729 |
| 0.379 | −0.537 | 5.729 |
| 0.375 | −0.536 | 5.729 |
| 0.371 | −0.534 | 5.729 |
| 0.368 | −0.531 | 5.729 |
| 0.365 | −0.528 | 5.729 |
| 0.363 | −0.525 | 5.729 |
| 0.361 | −0.521 | 5.729 |
| 0.360 | −0.519 | 5.729 |
| 0.359 | −0.517 | 5.729 |
| 0.358 | −0.514 | 5.729 |
| 0.357 | −0.512 | 5.729 |
| 0.356 | −0.509 | 5.729 |
| 0.355 | −0.507 | 5.729 |
| 0.354 | −0.505 | 5.729 |
| 0.353 | −0.502 | 5.729 |
| 0.352 | −0.500 | 5.729 |
| 0.351 | −0.497 | 5.729 |
| 0.346 | −0.485 | 5.729 |
| 0.341 | −0.474 | 5.729 |
| 0.336 | −0.462 | 5.729 |
| 0.331 | −0.450 | 5.729 |
| 0.325 | −0.438 | 5.729 |
| 0.320 | −0.427 | 5.729 |
| 0.314 | −0.415 | 5.729 |
| 0.308 | −0.403 | 5.729 |
| 0.302 | −0.392 | 5.729 |
| 0.296 | −0.380 | 5.729 |
| 0.290 | −0.369 | 5.729 |
| 0.284 | −0.358 | 5.729 |

TABLE 2-continued

| | X | Y | Z |
|---|---|---|---|
| | 0.277 | −0.347 | 5.729 |
| | 0.271 | −0.335 | 5.729 |
| | 0.264 | −0.324 | 5.729 |
| | 0.257 | −0.314 | 5.729 |
| | 0.250 | −0.303 | 5.729 |
| | 0.243 | −0.292 | 5.729 |
| | 0.236 | −0.281 | 5.729 |
| | 0.228 | −0.271 | 5.729 |
| | 0.220 | −0.260 | 5.729 |
| | 0.213 | −0.250 | 5.729 |
| | 0.205 | −0.240 | 5.729 |
| | 0.196 | −0.230 | 5.729 |
| | 0.188 | −0.220 | 5.729 |
| | 0.179 | −0.210 | 5.729 |
| | 0.171 | −0.201 | 5.729 |
| | 0.162 | −0.192 | 5.729 |
| | 0.153 | −0.182 | 5.729 |
| | 0.143 | −0.173 | 5.729 |
| | 0.134 | −0.165 | 5.729 |
| | 0.124 | −0.156 | 5.729 |
| | 0.115 | −0.148 | 5.729 |
| | 0.105 | −0.139 | 5.729 |
| | 0.094 | −0.131 | 5.729 |
| | 0.084 | −0.124 | 5.729 |
| | 0.074 | −0.116 | 5.729 |
| | 0.063 | −0.109 | 5.729 |
| | 0.052 | −0.102 | 5.729 |
| | 0.041 | −0.095 | 5.729 |
| | 0.030 | −0.088 | 5.729 |
| | 0.019 | −0.082 | 5.729 |
| | 0.007 | −0.076 | 5.729 |
| | −0.004 | −0.070 | 5.729 |
| | −0.016 | −0.065 | 5.729 |
| | −0.028 | −0.059 | 5.729 |
| | −0.040 | −0.054 | 5.729 |
| | −0.052 | −0.050 | 5.729 |
| | −0.064 | −0.045 | 5.729 |
| | −0.076 | −0.041 | 5.729 |
| | −0.088 | −0.037 | 5.729 |
| | −0.101 | −0.033 | 5.729 |
| | −0.113 | −0.030 | 5.729 |
| | −0.126 | −0.027 | 5.729 |
| | −0.138 | −0.024 | 5.729 |
| | −0.151 | −0.021 | 5.729 |
| | −0.164 | −0.019 | 5.729 |
| | −0.176 | −0.017 | 5.729 |
| | −0.189 | −0.015 | 5.729 |
| | −0.202 | −0.014 | 5.729 |
| | −0.215 | −0.012 | 5.729 |
| | −0.228 | −0.011 | 5.729 |
| | −0.241 | −0.011 | 5.729 |
| | −0.254 | −0.010 | 5.729 |
| | −0.267 | −0.010 | 5.729 |
| | −0.279 | −0.009 | 5.729 |
| | −0.292 | −0.009 | 5.729 |
| | −0.305 | −0.009 | 5.729 |
| | −0.318 | −0.009 | 5.729 |
| | −0.331 | −0.010 | 5.729 |
| | −0.344 | −0.010 | 5.729 |
| | −0.357 | −0.010 | 5.729 |
| | −0.370 | −0.010 | 5.729 |
| | −0.383 | −0.010 | 5.729 |
| | −0.396 | −0.010 | 5.729 |
| | −0.409 | −0.009 | 5.729 |
| | −0.422 | −0.009 | 5.729 |
| | −0.434 | −0.008 | 5.729 |
| | −0.447 | −0.007 | 5.729 |
| | −0.450 | −0.007 | 5.729 |
| | −0.452 | −0.006 | 5.729 |
| | −0.455 | −0.006 | 5.729 |
| | −0.458 | −0.006 | 5.729 |
| | −0.460 | −0.006 | 5.729 |
| | −0.463 | −0.005 | 5.729 |
| | −0.465 | −0.005 | 5.729 |
| | −0.468 | −0.005 | 5.729 |
| | −0.470 | −0.004 | 5.729 |
| | −0.473 | −0.004 | 5.729 |

TABLE 2-continued

| | X | Y | Z |
|---|---|---|---|
| | −0.477 | −0.003 | 5.729 |
| | −0.481 | −0.002 | 5.729 |
| | −0.485 | 0.000 | 5.729 |
| | −0.489 | 0.002 | 5.729 |
| | −0.492 | 0.005 | 5.729 |
| | −0.496 | 0.008 | 5.729 |
| | −0.499 | 0.011 | 5.729 |
| | −0.501 | 0.014 | 5.729 |
| | −0.504 | 0.018 | 5.729 |
| | −0.506 | 0.022 | 5.729 |
| | −0.507 | 0.026 | 5.729 |
| | −0.509 | 0.030 | 5.729 |
| | −0.510 | 0.034 | 5.729 |
| | −0.510 | 0.038 | 5.729 |
| | −0.510 | 0.043 | 5.729 |
| | −0.510 | 0.047 | 5.729 |
| | −0.510 | 0.051 | 5.729 |
| | −0.509 | 0.055 | 5.729 |
| SECTION 2 | −0.488 | 0.214 | 6.029 |
| | −0.486 | 0.217 | 6.029 |
| | −0.485 | 0.220 | 6.029 |
| | −0.483 | 0.223 | 6.029 |
| | −0.481 | 0.226 | 6.029 |
| | −0.480 | 0.229 | 6.029 |
| | −0.478 | 0.232 | 6.029 |
| | −0.476 | 0.235 | 6.029 |
| | −0.474 | 0.238 | 6.029 |
| | −0.472 | 0.241 | 6.029 |
| | −0.471 | 0.244 | 6.029 |
| | −0.460 | 0.259 | 6.029 |
| | −0.449 | 0.272 | 6.029 |
| | −0.437 | 0.285 | 6.029 |
| | −0.425 | 0.298 | 6.029 |
| | −0.411 | 0.309 | 6.029 |
| | −0.397 | 0.319 | 6.029 |
| | −0.382 | 0.329 | 6.029 |
| | −0.367 | 0.337 | 6.029 |
| | −0.351 | 0.344 | 6.029 |
| | −0.334 | 0.351 | 6.029 |
| | −0.317 | 0.356 | 6.029 |
| | −0.300 | 0.360 | 6.029 |
| | −0.283 | 0.362 | 6.029 |
| | −0.265 | 0.364 | 6.029 |
| | −0.248 | 0.364 | 6.029 |
| | −0.230 | 0.364 | 6.029 |
| | −0.213 | 0.362 | 6.029 |
| | −0.195 | 0.359 | 6.029 |
| | −0.178 | 0.355 | 6.029 |
| | −0.161 | 0.350 | 6.029 |
| | −0.144 | 0.345 | 6.029 |
| | −0.128 | 0.338 | 6.029 |
| | −0.112 | 0.331 | 6.029 |
| | −0.097 | 0.322 | 6.029 |
| | −0.081 | 0.314 | 6.029 |
| | −0.067 | 0.304 | 6.029 |
| | −0.052 | 0.294 | 6.029 |
| | −0.038 | 0.283 | 6.029 |
| | −0.024 | 0.272 | 6.029 |
| | −0.011 | 0.260 | 6.029 |
| | 0.002 | 0.249 | 6.029 |
| | 0.014 | 0.236 | 6.029 |
| | 0.027 | 0.224 | 6.029 |
| | 0.039 | 0.211 | 6.029 |
| | 0.050 | 0.198 | 6.029 |
| | 0.062 | 0.184 | 6.029 |
| | 0.073 | 0.171 | 6.029 |
| | 0.084 | 0.157 | 6.029 |
| | 0.095 | 0.143 | 6.029 |
| | 0.106 | 0.129 | 6.029 |
| | 0.116 | 0.115 | 6.029 |
| | 0.126 | 0.101 | 6.029 |
| | 0.136 | 0.086 | 6.029 |
| | 0.146 | 0.072 | 6.029 |
| | 0.156 | 0.057 | 6.029 |
| | 0.166 | 0.042 | 6.029 |
| | 0.175 | 0.028 | 6.029 |
| | 0.185 | 0.013 | 6.029 |

TABLE 2-continued

| X | Y | Z |
|---|---|---|
| 0.194 | −0.002 | 6.029 |
| 0.203 | −0.018 | 6.029 |
| 0.212 | −0.033 | 6.029 |
| 0.220 | −0.048 | 6.029 |
| 0.229 | −0.064 | 6.029 |
| 0.237 | −0.079 | 6.029 |
| 0.246 | −0.095 | 6.029 |
| 0.254 | −0.110 | 6.029 |
| 0.262 | −0.126 | 6.029 |
| 0.269 | −0.142 | 6.029 |
| 0.277 | −0.158 | 6.029 |
| 0.285 | −0.173 | 6.029 |
| 0.292 | −0.189 | 6.029 |
| 0.299 | −0.206 | 6.029 |
| 0.306 | −0.222 | 6.029 |
| 0.313 | −0.238 | 6.029 |
| 0.320 | −0.254 | 6.029 |
| 0.326 | −0.270 | 6.029 |
| 0.333 | −0.287 | 6.029 |
| 0.339 | −0.303 | 6.029 |
| 0.345 | −0.320 | 6.029 |
| 0.351 | −0.336 | 6.029 |
| 0.357 | −0.353 | 6.029 |
| 0.363 | −0.370 | 6.029 |
| 0.368 | −0.386 | 6.029 |
| 0.374 | −0.403 | 6.029 |
| 0.379 | −0.420 | 6.029 |
| 0.384 | −0.437 | 6.029 |
| 0.389 | −0.454 | 6.029 |
| 0.394 | −0.471 | 6.029 |
| 0.399 | −0.488 | 6.029 |
| 0.400 | −0.491 | 6.029 |
| 0.400 | −0.494 | 6.029 |
| 0.401 | −0.498 | 6.029 |
| 0.402 | −0.501 | 6.029 |
| 0.403 | −0.505 | 6.029 |
| 0.404 | −0.508 | 6.029 |
| 0.405 | −0.511 | 6.029 |
| 0.406 | −0.515 | 6.029 |
| 0.407 | −0.518 | 6.029 |
| 0.408 | −0.522 | 6.029 |
| 0.408 | −0.525 | 6.029 |
| 0.408 | −0.527 | 6.029 |
| 0.408 | −0.530 | 6.029 |
| 0.407 | −0.533 | 6.029 |
| 0.406 | −0.536 | 6.029 |
| 0.404 | −0.538 | 6.029 |
| 0.402 | −0.541 | 6.029 |
| 0.400 | −0.543 | 6.029 |
| 0.397 | −0.544 | 6.029 |
| 0.394 | −0.545 | 6.029 |
| 0.391 | −0.546 | 6.029 |
| 0.388 | −0.546 | 6.029 |
| 0.385 | −0.546 | 6.029 |
| 0.383 | −0.545 | 6.029 |
| 0.380 | −0.544 | 6.029 |
| 0.377 | −0.542 | 6.029 |
| 0.375 | −0.540 | 6.029 |
| 0.373 | −0.538 | 6.029 |
| 0.371 | −0.536 | 6.029 |
| 0.370 | −0.533 | 6.029 |
| 0.369 | −0.531 | 6.029 |
| 0.368 | −0.528 | 6.029 |
| 0.366 | −0.526 | 6.029 |
| 0.365 | −0.524 | 6.029 |
| 0.364 | −0.521 | 6.029 |
| 0.362 | −0.519 | 6.029 |
| 0.361 | −0.517 | 6.029 |
| 0.360 | −0.514 | 6.029 |
| 0.359 | −0.512 | 6.029 |
| 0.352 | −0.500 | 6.029 |
| 0.346 | −0.489 | 6.029 |
| 0.339 | −0.477 | 6.029 |
| 0.332 | −0.466 | 6.029 |
| 0.326 | −0.454 | 6.029 |
| 0.319 | −0.442 | 6.029 |
| 0.312 | −0.431 | 6.029 |
| 0.305 | −0.419 | 6.029 |
| 0.299 | −0.408 | 6.029 |
| 0.292 | −0.396 | 6.029 |
| 0.285 | −0.385 | 6.029 |
| 0.278 | −0.374 | 6.029 |
| 0.270 | −0.362 | 6.029 |
| 0.263 | −0.351 | 6.029 |
| 0.256 | −0.340 | 6.029 |
| 0.249 | −0.329 | 6.029 |
| 0.241 | −0.318 | 6.029 |
| 0.234 | −0.306 | 6.029 |
| 0.226 | −0.295 | 6.029 |
| 0.219 | −0.284 | 6.029 |
| 0.211 | −0.274 | 6.029 |
| 0.203 | −0.263 | 6.029 |
| 0.195 | −0.252 | 6.029 |
| 0.187 | −0.241 | 6.029 |
| 0.179 | −0.230 | 6.029 |
| 0.171 | −0.220 | 6.029 |
| 0.163 | −0.209 | 6.029 |
| 0.155 | −0.199 | 6.029 |
| 0.146 | −0.188 | 6.029 |
| 0.138 | −0.178 | 6.029 |
| 0.129 | −0.168 | 6.029 |
| 0.120 | −0.158 | 6.029 |
| 0.111 | −0.148 | 6.029 |
| 0.102 | −0.138 | 6.029 |
| 0.093 | −0.128 | 6.029 |
| 0.084 | −0.118 | 6.029 |
| 0.075 | −0.109 | 6.029 |
| 0.065 | −0.099 | 6.029 |
| 0.056 | −0.090 | 6.029 |
| 0.046 | −0.081 | 6.029 |
| 0.037 | −0.072 | 6.029 |
| 0.027 | −0.063 | 6.029 |
| 0.017 | −0.054 | 6.029 |
| 0.006 | −0.045 | 6.029 |
| −0.004 | −0.037 | 6.029 |
| −0.014 | −0.028 | 6.029 |
| −0.025 | −0.020 | 6.029 |
| −0.035 | −0.012 | 6.029 |
| −0.046 | −0.004 | 6.029 |
| −0.057 | 0.004 | 6.029 |
| −0.068 | 0.012 | 6.029 |
| −0.079 | 0.019 | 6.029 |
| −0.090 | 0.026 | 6.029 |
| −0.102 | 0.033 | 6.029 |
| −0.113 | 0.040 | 6.029 |
| −0.125 | 0.047 | 6.029 |
| −0.136 | 0.053 | 6.029 |
| −0.148 | 0.060 | 6.029 |
| −0.160 | 0.066 | 6.029 |
| −0.172 | 0.071 | 6.029 |
| −0.184 | 0.077 | 6.029 |
| −0.196 | 0.082 | 6.029 |
| −0.209 | 0.087 | 6.029 |
| −0.221 | 0.092 | 6.029 |
| −0.234 | 0.097 | 6.029 |
| −0.246 | 0.101 | 6.029 |
| −0.259 | 0.105 | 6.029 |
| −0.272 | 0.109 | 6.029 |
| −0.285 | 0.113 | 6.029 |
| −0.298 | 0.116 | 6.029 |
| −0.311 | 0.119 | 6.029 |
| −0.324 | 0.122 | 6.029 |
| −0.337 | 0.125 | 6.029 |
| −0.350 | 0.127 | 6.029 |
| −0.363 | 0.129 | 6.029 |
| −0.377 | 0.131 | 6.029 |
| −0.390 | 0.132 | 6.029 |
| −0.403 | 0.133 | 6.029 |
| −0.417 | 0.134 | 6.029 |
| −0.419 | 0.135 | 6.029 |
| −0.422 | 0.135 | 6.029 |
| −0.425 | 0.135 | 6.029 |
| −0.427 | 0.135 | 6.029 |
| −0.430 | 0.135 | 6.029 |

TABLE 2-continued

| | X | Y | Z |
|---|---|---|---|
| | −0.433 | 0.135 | 6.029 |
| | −0.435 | 0.135 | 6.029 |
| | −0.438 | 0.135 | 6.029 |
| | −0.441 | 0.135 | 6.029 |
| | −0.443 | 0.136 | 6.029 |
| | −0.449 | 0.136 | 6.029 |
| | −0.455 | 0.137 | 6.029 |
| | −0.460 | 0.138 | 6.029 |
| | −0.465 | 0.140 | 6.029 |
| | −0.471 | 0.143 | 6.029 |
| | −0.475 | 0.146 | 6.029 |
| | −0.480 | 0.150 | 6.029 |
| | −0.483 | 0.154 | 6.029 |
| | −0.487 | 0.159 | 6.029 |
| | −0.489 | 0.164 | 6.029 |
| | −0.492 | 0.169 | 6.029 |
| | −0.493 | 0.175 | 6.029 |
| | −0.494 | 0.180 | 6.029 |
| | −0.494 | 0.186 | 6.029 |
| | −0.494 | 0.192 | 6.029 |
| | −0.493 | 0.198 | 6.029 |
| | −0.492 | 0.203 | 6.029 |
| | −0.490 | 0.208 | 6.029 |
| SECTION 3 | −0.480 | 0.270 | 6.154 |
| | −0.478 | 0.273 | 6.154 |
| | −0.477 | 0.276 | 6.154 |
| | −0.475 | 0.279 | 6.154 |
| | −0.473 | 0.282 | 6.154 |
| | −0.471 | 0.285 | 6.154 |
| | −0.469 | 0.288 | 6.154 |
| | −0.467 | 0.290 | 6.154 |
| | −0.465 | 0.293 | 6.154 |
| | −0.463 | 0.296 | 6.154 |
| | −0.461 | 0.299 | 6.154 |
| | −0.450 | 0.312 | 6.154 |
| | −0.438 | 0.325 | 6.154 |
| | −0.424 | 0.336 | 6.154 |
| | −0.410 | 0.346 | 6.154 |
| | −0.395 | 0.355 | 6.154 |
| | −0.380 | 0.363 | 6.154 |
| | −0.364 | 0.370 | 6.154 |
| | −0.347 | 0.376 | 6.154 |
| | −0.331 | 0.380 | 6.154 |
| | −0.313 | 0.384 | 6.154 |
| | −0.296 | 0.386 | 6.154 |
| | −0.279 | 0.387 | 6.154 |
| | −0.261 | 0.387 | 6.154 |
| | −0.244 | 0.385 | 6.154 |
| | −0.227 | 0.383 | 6.154 |
| | −0.210 | 0.380 | 6.154 |
| | −0.193 | 0.375 | 6.154 |
| | −0.176 | 0.370 | 6.154 |
| | −0.160 | 0.364 | 6.154 |
| | −0.144 | 0.357 | 6.154 |
| | −0.128 | 0.350 | 6.154 |
| | −0.113 | 0.341 | 6.154 |
| | −0.098 | 0.332 | 6.154 |
| | −0.083 | 0.323 | 6.154 |
| | −0.069 | 0.313 | 6.154 |
| | −0.055 | 0.302 | 6.154 |
| | −0.042 | 0.291 | 6.154 |
| | −0.029 | 0.279 | 6.154 |
| | −0.016 | 0.267 | 6.154 |
| | −0.004 | 0.255 | 6.154 |
| | 0.008 | 0.243 | 6.154 |
| | 0.020 | 0.230 | 6.154 |
| | 0.032 | 0.217 | 6.154 |
| | 0.043 | 0.204 | 6.154 |
| | 0.054 | 0.190 | 6.154 |
| | 0.065 | 0.176 | 6.154 |
| | 0.076 | 0.163 | 6.154 |
| | 0.086 | 0.149 | 6.154 |
| | 0.097 | 0.135 | 6.154 |
| | 0.107 | 0.121 | 6.154 |
| | 0.117 | 0.106 | 6.154 |
| | 0.126 | 0.092 | 6.154 |
| | 0.136 | 0.077 | 6.154 |

TABLE 2-continued

| X | Y | Z |
|---|---|---|
| 0.146 | 0.063 | 6.154 |
| 0.155 | 0.048 | 6.154 |
| 0.164 | 0.033 | 6.154 |
| 0.173 | 0.018 | 6.154 |
| 0.182 | 0.003 | 6.154 |
| 0.191 | −0.012 | 6.154 |
| 0.200 | −0.027 | 6.154 |
| 0.208 | −0.042 | 6.154 |
| 0.216 | −0.057 | 6.154 |
| 0.224 | −0.073 | 6.154 |
| 0.233 | −0.088 | 6.154 |
| 0.240 | −0.104 | 6.154 |
| 0.248 | −0.119 | 6.154 |
| 0.256 | −0.135 | 6.154 |
| 0.263 | −0.151 | 6.154 |
| 0.271 | −0.166 | 6.154 |
| 0.278 | −0.182 | 6.154 |
| 0.285 | −0.198 | 6.154 |
| 0.292 | −0.214 | 6.154 |
| 0.299 | −0.230 | 6.154 |
| 0.306 | −0.246 | 6.154 |
| 0.312 | −0.262 | 6.154 |
| 0.319 | −0.278 | 6.154 |
| 0.325 | −0.295 | 6.154 |
| 0.331 | −0.311 | 6.154 |
| 0.338 | −0.327 | 6.154 |
| 0.344 | −0.344 | 6.154 |
| 0.350 | −0.360 | 6.154 |
| 0.356 | −0.376 | 6.154 |
| 0.361 | −0.393 | 6.154 |
| 0.367 | −0.409 | 6.154 |
| 0.373 | −0.426 | 6.154 |
| 0.378 | −0.442 | 6.154 |
| 0.384 | −0.459 | 6.154 |
| 0.389 | −0.475 | 6.154 |
| 0.394 | −0.492 | 6.154 |
| 0.395 | −0.495 | 6.154 |
| 0.396 | −0.499 | 6.154 |
| 0.397 | −0.502 | 6.154 |
| 0.398 | −0.505 | 6.154 |
| 0.399 | −0.509 | 6.154 |
| 0.400 | −0.512 | 6.154 |
| 0.401 | −0.515 | 6.154 |
| 0.403 | −0.519 | 6.154 |
| 0.404 | −0.522 | 6.154 |
| 0.405 | −0.525 | 6.154 |
| 0.405 | −0.528 | 6.154 |
| 0.405 | −0.530 | 6.154 |
| 0.405 | −0.533 | 6.154 |
| 0.404 | −0.536 | 6.154 |
| 0.403 | −0.538 | 6.154 |
| 0.402 | −0.540 | 6.154 |
| 0.400 | −0.542 | 6.154 |
| 0.398 | −0.544 | 6.154 |
| 0.396 | −0.545 | 6.154 |
| 0.394 | −0.546 | 6.154 |
| 0.391 | −0.547 | 6.154 |
| 0.389 | −0.547 | 6.154 |
| 0.386 | −0.547 | 6.154 |
| 0.383 | −0.547 | 6.154 |
| 0.381 | −0.546 | 6.154 |
| 0.379 | −0.544 | 6.154 |
| 0.376 | −0.543 | 6.154 |
| 0.375 | −0.541 | 6.154 |
| 0.373 | −0.539 | 6.154 |
| 0.372 | −0.536 | 6.154 |
| 0.370 | −0.534 | 6.154 |
| 0.369 | −0.532 | 6.154 |
| 0.368 | −0.529 | 6.154 |
| 0.366 | −0.527 | 6.154 |
| 0.365 | −0.525 | 6.154 |
| 0.363 | −0.522 | 6.154 |
| 0.362 | −0.520 | 6.154 |
| 0.361 | −0.518 | 6.154 |
| 0.359 | −0.515 | 6.154 |
| 0.352 | −0.504 | 6.154 |
| 0.345 | −0.492 | 6.154 |

TABLE 2-continued

| | X | Y | Z |
|---|---|---|---|
| | 0.338 | −0.480 | 6.154 |
| | 0.331 | −0.469 | 6.154 |
| | 0.324 | −0.457 | 6.154 |
| | 0.317 | −0.445 | 6.154 |
| | 0.310 | −0.434 | 6.154 |
| | 0.303 | −0.422 | 6.154 |
| | 0.296 | −0.411 | 6.154 |
| | 0.288 | −0.399 | 6.154 |
| | 0.281 | −0.388 | 6.154 |
| | 0.274 | −0.376 | 6.154 |
| | 0.266 | −0.365 | 6.154 |
| | 0.259 | −0.353 | 6.154 |
| | 0.251 | −0.342 | 6.154 |
| | 0.244 | −0.330 | 6.154 |
| | 0.236 | −0.319 | 6.154 |
| | 0.229 | −0.308 | 6.154 |
| | 0.221 | −0.296 | 6.154 |
| | 0.213 | −0.285 | 6.154 |
| | 0.206 | −0.274 | 6.154 |
| | 0.198 | −0.263 | 6.154 |
| | 0.190 | −0.252 | 6.154 |
| | 0.182 | −0.241 | 6.154 |
| | 0.174 | −0.230 | 6.154 |
| | 0.166 | −0.219 | 6.154 |
| | 0.158 | −0.208 | 6.154 |
| | 0.150 | −0.197 | 6.154 |
| | 0.141 | −0.186 | 6.154 |
| | 0.133 | −0.175 | 6.154 |
| | 0.124 | −0.165 | 6.154 |
| | 0.116 | −0.154 | 6.154 |
| | 0.107 | −0.144 | 6.154 |
| | 0.099 | −0.133 | 6.154 |
| | 0.090 | −0.123 | 6.154 |
| | 0.081 | −0.112 | 6.154 |
| | 0.072 | −0.102 | 6.154 |
| | 0.063 | −0.092 | 6.154 |
| | 0.054 | −0.082 | 6.154 |
| | 0.045 | −0.072 | 6.154 |
| | 0.035 | −0.062 | 6.154 |
| | 0.026 | −0.052 | 6.154 |
| | 0.016 | −0.042 | 6.154 |
| | 0.007 | −0.033 | 6.154 |
| | −0.003 | −0.023 | 6.154 |
| | −0.013 | −0.014 | 6.154 |
| | −0.023 | −0.004 | 6.154 |
| | −0.033 | 0.005 | 6.154 |
| | −0.043 | 0.014 | 6.154 |
| | −0.053 | 0.023 | 6.154 |
| | −0.064 | 0.031 | 6.154 |
| | −0.074 | 0.040 | 6.154 |
| | −0.085 | 0.049 | 6.154 |
| | −0.096 | 0.057 | 6.154 |
| | −0.107 | 0.065 | 6.154 |
| | −0.118 | 0.073 | 6.154 |
| | −0.129 | 0.081 | 6.154 |
| | −0.140 | 0.089 | 6.154 |
| | −0.151 | 0.096 | 6.154 |
| | −0.163 | 0.103 | 6.154 |
| | −0.175 | 0.110 | 6.154 |
| | −0.186 | 0.117 | 6.154 |
| | −0.198 | 0.124 | 6.154 |
| | −0.210 | 0.130 | 6.154 |
| | −0.223 | 0.136 | 6.154 |
| | −0.235 | 0.142 | 6.154 |
| | −0.247 | 0.147 | 6.154 |
| | −0.260 | 0.152 | 6.154 |
| | −0.273 | 0.157 | 6.154 |
| | −0.286 | 0.162 | 6.154 |
| | −0.299 | 0.166 | 6.154 |
| | −0.312 | 0.170 | 6.154 |
| | −0.325 | 0.173 | 6.154 |
| | −0.338 | 0.177 | 6.154 |
| | −0.351 | 0.179 | 6.154 |
| | −0.365 | 0.182 | 6.154 |
| | −0.378 | 0.183 | 6.154 |
| | −0.392 | 0.185 | 6.154 |
| | −0.405 | 0.186 | 6.154 |

TABLE 2-continued

| | X | Y | Z |
|---|---|---|---|
| | −0.408 | 0.186 | 6.154 |
| | −0.411 | 0.186 | 6.154 |
| | −0.414 | 0.186 | 6.154 |
| | −0.416 | 0.187 | 6.154 |
| | −0.419 | 0.187 | 6.154 |
| | −0.422 | 0.187 | 6.154 |
| | −0.424 | 0.187 | 6.154 |
| | −0.427 | 0.187 | 6.154 |
| | −0.430 | 0.187 | 6.154 |
| | −0.433 | 0.187 | 6.154 |
| | −0.439 | 0.187 | 6.154 |
| | −0.445 | 0.188 | 6.154 |
| | −0.451 | 0.190 | 6.154 |
| | −0.457 | 0.192 | 6.154 |
| | −0.462 | 0.194 | 6.154 |
| | −0.467 | 0.198 | 6.154 |
| | −0.472 | 0.202 | 6.154 |
| | −0.476 | 0.206 | 6.154 |
| | −0.480 | 0.211 | 6.154 |
| | −0.483 | 0.217 | 6.154 |
| | −0.485 | 0.222 | 6.154 |
| | −0.487 | 0.228 | 6.154 |
| | −0.488 | 0.234 | 6.154 |
| | −0.488 | 0.240 | 6.154 |
| | −0.488 | 0.246 | 6.154 |
| | −0.487 | 0.253 | 6.154 |
| | −0.485 | 0.258 | 6.154 |
| | −0.483 | 0.264 | 6.154 |
| SECTION 4 | −0.472 | 0.318 | 6.279 |
| | −0.470 | 0.321 | 6.279 |
| | −0.469 | 0.324 | 6.279 |
| | −0.467 | 0.327 | 6.279 |
| | −0.465 | 0.330 | 6.279 |
| | −0.463 | 0.333 | 6.279 |
| | −0.461 | 0.335 | 6.279 |
| | −0.459 | 0.338 | 6.279 |
| | −0.456 | 0.341 | 6.279 |
| | −0.454 | 0.343 | 6.279 |
| | −0.452 | 0.346 | 6.279 |
| | −0.440 | 0.358 | 6.279 |
| | −0.426 | 0.369 | 6.279 |
| | −0.412 | 0.379 | 6.279 |
| | −0.397 | 0.388 | 6.279 |
| | −0.381 | 0.395 | 6.279 |
| | −0.365 | 0.400 | 6.279 |
| | −0.348 | 0.405 | 6.279 |
| | −0.331 | 0.408 | 6.279 |
| | −0.314 | 0.410 | 6.279 |
| | −0.297 | 0.411 | 6.279 |
| | −0.279 | 0.411 | 6.279 |
| | −0.262 | 0.409 | 6.279 |
| | −0.245 | 0.407 | 6.279 |
| | −0.228 | 0.403 | 6.279 |
| | −0.211 | 0.399 | 6.279 |
| | −0.195 | 0.393 | 6.279 |
| | −0.179 | 0.387 | 6.279 |
| | −0.163 | 0.380 | 6.279 |
| | −0.147 | 0.372 | 6.279 |
| | −0.132 | 0.364 | 6.279 |
| | −0.118 | 0.355 | 6.279 |
| | −0.103 | 0.345 | 6.279 |
| | −0.089 | 0.335 | 6.279 |
| | −0.075 | 0.325 | 6.279 |
| | −0.062 | 0.314 | 6.279 |
| | −0.049 | 0.302 | 6.279 |
| | −0.037 | 0.290 | 6.279 |
| | −0.024 | 0.278 | 6.279 |
| | −0.012 | 0.266 | 6.279 |
| | −0.001 | 0.253 | 6.279 |
| | 0.011 | 0.240 | 6.279 |
| | 0.022 | 0.227 | 6.279 |
| | 0.033 | 0.213 | 6.279 |
| | 0.044 | 0.200 | 6.279 |
| | 0.055 | 0.186 | 6.279 |
| | 0.065 | 0.172 | 6.279 |
| | 0.075 | 0.158 | 6.279 |
| | 0.085 | 0.144 | 6.279 |

TABLE 2-continued

| X | Y | Z |
|---|---|---|
| 0.095 | 0.130 | 6.279 |
| 0.105 | 0.116 | 6.279 |
| 0.115 | 0.101 | 6.279 |
| 0.124 | 0.087 | 6.279 |
| 0.133 | 0.072 | 6.279 |
| 0.143 | 0.058 | 6.279 |
| 0.152 | 0.043 | 6.279 |
| 0.161 | 0.028 | 6.279 |
| 0.169 | 0.013 | 6.279 |
| 0.178 | −0.002 | 6.279 |
| 0.186 | −0.017 | 6.279 |
| 0.195 | −0.032 | 6.279 |
| 0.203 | −0.047 | 6.279 |
| 0.211 | −0.063 | 6.279 |
| 0.219 | −0.078 | 6.279 |
| 0.227 | −0.094 | 6.279 |
| 0.234 | −0.109 | 6.279 |
| 0.242 | −0.125 | 6.279 |
| 0.249 | −0.140 | 6.279 |
| 0.257 | −0.156 | 6.279 |
| 0.264 | −0.172 | 6.279 |
| 0.271 | −0.187 | 6.279 |
| 0.278 | −0.203 | 6.279 |
| 0.285 | −0.219 | 6.279 |
| 0.292 | −0.235 | 6.279 |
| 0.298 | −0.251 | 6.279 |
| 0.305 | −0.267 | 6.279 |
| 0.311 | −0.283 | 6.279 |
| 0.318 | −0.299 | 6.279 |
| 0.324 | −0.315 | 6.279 |
| 0.330 | −0.331 | 6.279 |
| 0.337 | −0.348 | 6.279 |
| 0.343 | −0.364 | 6.279 |
| 0.349 | −0.380 | 6.279 |
| 0.355 | −0.396 | 6.279 |
| 0.361 | −0.413 | 6.279 |
| 0.366 | −0.429 | 6.279 |
| 0.372 | −0.445 | 6.279 |
| 0.378 | −0.462 | 6.279 |
| 0.384 | −0.478 | 6.279 |
| 0.389 | −0.494 | 6.279 |
| 0.391 | −0.497 | 6.279 |
| 0.392 | −0.501 | 6.279 |
| 0.393 | −0.504 | 6.279 |
| 0.394 | −0.507 | 6.279 |
| 0.395 | −0.511 | 6.279 |
| 0.396 | −0.514 | 6.279 |
| 0.397 | −0.517 | 6.279 |
| 0.399 | −0.520 | 6.279 |
| 0.400 | −0.524 | 6.279 |
| 0.401 | −0.527 | 6.279 |
| 0.401 | −0.529 | 6.279 |
| 0.402 | −0.532 | 6.279 |
| 0.401 | −0.534 | 6.279 |
| 0.401 | −0.536 | 6.279 |
| 0.400 | −0.538 | 6.279 |
| 0.399 | −0.540 | 6.279 |
| 0.397 | −0.542 | 6.279 |
| 0.396 | −0.544 | 6.279 |
| 0.394 | −0.545 | 6.279 |
| 0.392 | −0.546 | 6.279 |
| 0.389 | −0.547 | 6.279 |
| 0.387 | −0.547 | 6.279 |
| 0.385 | −0.547 | 6.279 |
| 0.382 | −0.547 | 6.279 |
| 0.380 | −0.546 | 6.279 |
| 0.378 | −0.545 | 6.279 |
| 0.376 | −0.543 | 6.279 |
| 0.374 | −0.542 | 6.279 |
| 0.373 | −0.540 | 6.279 |
| 0.372 | −0.538 | 6.279 |
| 0.370 | −0.535 | 6.279 |
| 0.369 | −0.533 | 6.279 |
| 0.367 | −0.530 | 6.279 |
| 0.366 | −0.528 | 6.279 |
| 0.364 | −0.526 | 6.279 |
| 0.363 | −0.523 | 6.279 |
| 0.361 | −0.521 | 6.279 |
| 0.360 | −0.519 | 6.279 |
| 0.358 | −0.516 | 6.279 |
| 0.351 | −0.505 | 6.279 |
| 0.344 | −0.493 | 6.279 |
| 0.336 | −0.481 | 6.279 |
| 0.329 | −0.469 | 6.279 |
| 0.322 | −0.458 | 6.279 |
| 0.314 | −0.446 | 6.279 |
| 0.307 | −0.434 | 6.279 |
| 0.299 | −0.422 | 6.279 |
| 0.292 | −0.411 | 6.279 |
| 0.284 | −0.399 | 6.279 |
| 0.277 | −0.387 | 6.279 |
| 0.269 | −0.376 | 6.279 |
| 0.262 | −0.364 | 6.279 |
| 0.254 | −0.353 | 6.279 |
| 0.247 | −0.341 | 6.279 |
| 0.239 | −0.329 | 6.279 |
| 0.231 | −0.318 | 6.279 |
| 0.223 | −0.306 | 6.279 |
| 0.216 | −0.295 | 6.279 |
| 0.208 | −0.283 | 6.279 |
| 0.200 | −0.272 | 6.279 |
| 0.192 | −0.261 | 6.279 |
| 0.184 | −0.249 | 6.279 |
| 0.176 | −0.238 | 6.279 |
| 0.168 | −0.226 | 6.279 |
| 0.160 | −0.215 | 6.279 |
| 0.152 | −0.204 | 6.279 |
| 0.144 | −0.193 | 6.279 |
| 0.136 | −0.181 | 6.279 |
| 0.128 | −0.170 | 6.279 |
| 0.120 | −0.159 | 6.279 |
| 0.111 | −0.148 | 6.279 |
| 0.103 | −0.137 | 6.279 |
| 0.094 | −0.126 | 6.279 |
| 0.086 | −0.115 | 6.279 |
| 0.077 | −0.104 | 6.279 |
| 0.069 | −0.093 | 6.279 |
| 0.060 | −0.083 | 6.279 |
| 0.051 | −0.072 | 6.279 |
| 0.042 | −0.061 | 6.279 |
| 0.033 | −0.051 | 6.279 |
| 0.024 | −0.040 | 6.279 |
| 0.015 | −0.030 | 6.279 |
| 0.006 | −0.019 | 6.279 |
| −0.003 | −0.009 | 6.279 |
| −0.013 | 0.001 | 6.279 |
| −0.022 | 0.011 | 6.279 |
| −0.032 | 0.021 | 6.279 |
| −0.042 | 0.031 | 6.279 |
| −0.051 | 0.041 | 6.279 |
| −0.061 | 0.051 | 6.279 |
| −0.071 | 0.060 | 6.279 |
| −0.081 | 0.070 | 6.279 |
| −0.092 | 0.079 | 6.279 |
| −0.102 | 0.088 | 6.279 |
| −0.112 | 0.097 | 6.279 |
| −0.123 | 0.106 | 6.279 |
| −0.134 | 0.115 | 6.279 |
| −0.145 | 0.123 | 6.279 |
| −0.156 | 0.132 | 6.279 |
| −0.167 | 0.140 | 6.279 |
| −0.178 | 0.148 | 6.279 |
| −0.190 | 0.156 | 6.279 |
| −0.202 | 0.163 | 6.279 |
| −0.213 | 0.170 | 6.279 |
| −0.225 | 0.177 | 6.279 |
| −0.238 | 0.184 | 6.279 |
| −0.250 | 0.190 | 6.279 |
| −0.263 | 0.196 | 6.279 |
| −0.275 | 0.202 | 6.279 |
| −0.288 | 0.207 | 6.279 |
| −0.301 | 0.211 | 6.279 |
| −0.314 | 0.216 | 6.279 |
| −0.328 | 0.220 | 6.279 |

TABLE 2-continued

| | X | Y | Z |
|---|---|---|---|
| | −0.341 | 0.223 | 6.279 |
| | −0.355 | 0.226 | 6.279 |
| | −0.368 | 0.228 | 6.279 |
| | −0.382 | 0.230 | 6.279 |
| | −0.396 | 0.231 | 6.279 |
| | −0.399 | 0.231 | 6.279 |
| | −0.401 | 0.232 | 6.279 |
| | −0.404 | 0.232 | 6.279 |
| | −0.407 | 0.232 | 6.279 |
| | −0.410 | 0.232 | 6.279 |
| | −0.413 | 0.232 | 6.279 |
| | −0.415 | 0.232 | 6.279 |
| | −0.418 | 0.232 | 6.279 |
| | −0.421 | 0.232 | 6.279 |
| | −0.424 | 0.232 | 6.279 |
| | −0.430 | 0.232 | 6.279 |
| | −0.436 | 0.233 | 6.279 |
| | −0.443 | 0.235 | 6.279 |
| | −0.449 | 0.237 | 6.279 |
| | −0.455 | 0.239 | 6.279 |
| | −0.460 | 0.243 | 6.279 |
| | −0.465 | 0.247 | 6.279 |
| | −0.469 | 0.252 | 6.279 |
| | −0.473 | 0.257 | 6.279 |
| | −0.476 | 0.263 | 6.279 |
| | −0.479 | 0.269 | 6.279 |
| | −0.481 | 0.275 | 6.279 |
| | −0.482 | 0.281 | 6.279 |
| | −0.482 | 0.288 | 6.279 |
| | −0.481 | 0.294 | 6.279 |
| | −0.480 | 0.300 | 6.279 |
| | −0.478 | 0.307 | 6.279 |
| | −0.475 | 0.312 | 6.279 |
| SECTION 5 | −0.465 | 0.356 | 6.404 |
| | −0.463 | 0.359 | 6.404 |
| | −0.461 | 0.361 | 6.404 |
| | −0.459 | 0.364 | 6.404 |
| | −0.457 | 0.367 | 6.404 |
| | −0.455 | 0.370 | 6.404 |
| | −0.453 | 0.372 | 6.404 |
| | −0.450 | 0.375 | 6.404 |
| | −0.448 | 0.378 | 6.404 |
| | −0.446 | 0.380 | 6.404 |
| | −0.443 | 0.382 | 6.404 |
| | −0.430 | 0.394 | 6.404 |
| | −0.416 | 0.404 | 6.404 |
| | −0.401 | 0.412 | 6.404 |
| | −0.386 | 0.419 | 6.404 |
| | −0.369 | 0.425 | 6.404 |
| | −0.353 | 0.429 | 6.404 |
| | −0.336 | 0.432 | 6.404 |
| | −0.318 | 0.433 | 6.404 |
| | −0.301 | 0.434 | 6.404 |
| | −0.284 | 0.433 | 6.404 |
| | −0.267 | 0.431 | 6.404 |
| | −0.250 | 0.427 | 6.404 |
| | −0.233 | 0.423 | 6.404 |
| | −0.217 | 0.418 | 6.404 |
| | −0.201 | 0.412 | 6.404 |
| | −0.185 | 0.405 | 6.404 |
| | −0.170 | 0.397 | 6.404 |
| | −0.154 | 0.389 | 6.404 |
| | −0.140 | 0.380 | 6.404 |
| | −0.125 | 0.371 | 6.404 |
| | −0.111 | 0.360 | 6.404 |
| | −0.098 | 0.350 | 6.404 |
| | −0.085 | 0.339 | 6.404 |
| | −0.072 | 0.328 | 6.404 |
| | −0.059 | 0.316 | 6.404 |
| | −0.047 | 0.304 | 6.404 |
| | −0.035 | 0.291 | 6.404 |
| | −0.023 | 0.279 | 6.404 |
| | −0.012 | 0.266 | 6.404 |
| | 0.000 | 0.253 | 6.404 |
| | 0.011 | 0.239 | 6.404 |
| | 0.021 | 0.226 | 6.404 |
| | 0.032 | 0.212 | 6.404 |

TABLE 2-continued

| X | Y | Z |
|---|---|---|
| 0.042 | 0.199 | 6.404 |
| 0.052 | 0.185 | 6.404 |
| 0.063 | 0.171 | 6.404 |
| 0.072 | 0.157 | 6.404 |
| 0.082 | 0.143 | 6.404 |
| 0.092 | 0.128 | 6.404 |
| 0.101 | 0.114 | 6.404 |
| 0.111 | 0.099 | 6.404 |
| 0.120 | 0.085 | 6.404 |
| 0.129 | 0.070 | 6.404 |
| 0.138 | 0.056 | 6.404 |
| 0.147 | 0.041 | 6.404 |
| 0.155 | 0.026 | 6.404 |
| 0.164 | 0.011 | 6.404 |
| 0.172 | −0.004 | 6.404 |
| 0.181 | −0.019 | 6.404 |
| 0.189 | −0.034 | 6.404 |
| 0.197 | −0.050 | 6.404 |
| 0.205 | −0.065 | 6.404 |
| 0.213 | −0.080 | 6.404 |
| 0.220 | −0.096 | 6.404 |
| 0.228 | −0.111 | 6.404 |
| 0.235 | −0.127 | 6.404 |
| 0.243 | −0.142 | 6.404 |
| 0.250 | −0.158 | 6.404 |
| 0.257 | −0.174 | 6.404 |
| 0.264 | −0.189 | 6.404 |
| 0.271 | −0.205 | 6.404 |
| 0.278 | −0.221 | 6.404 |
| 0.285 | −0.237 | 6.404 |
| 0.291 | −0.253 | 6.404 |
| 0.298 | −0.268 | 6.404 |
| 0.305 | −0.284 | 6.404 |
| 0.311 | −0.300 | 6.404 |
| 0.317 | −0.316 | 6.404 |
| 0.324 | −0.332 | 6.404 |
| 0.330 | −0.348 | 6.404 |
| 0.336 | −0.365 | 6.404 |
| 0.342 | −0.381 | 6.404 |
| 0.348 | −0.397 | 6.404 |
| 0.354 | −0.413 | 6.404 |
| 0.361 | −0.429 | 6.404 |
| 0.367 | −0.445 | 6.404 |
| 0.372 | −0.461 | 6.404 |
| 0.378 | −0.477 | 6.404 |
| 0.384 | −0.494 | 6.404 |
| 0.386 | −0.497 | 6.404 |
| 0.387 | −0.500 | 6.404 |
| 0.388 | −0.503 | 6.404 |
| 0.389 | −0.507 | 6.404 |
| 0.390 | −0.510 | 6.404 |
| 0.391 | −0.513 | 6.404 |
| 0.393 | −0.516 | 6.404 |
| 0.394 | −0.520 | 6.404 |
| 0.395 | −0.523 | 6.404 |
| 0.396 | −0.526 | 6.404 |
| 0.397 | −0.528 | 6.404 |
| 0.397 | −0.530 | 6.404 |
| 0.397 | −0.533 | 6.404 |
| 0.397 | −0.535 | 6.404 |
| 0.396 | −0.537 | 6.404 |
| 0.395 | −0.539 | 6.404 |
| 0.393 | −0.540 | 6.404 |
| 0.392 | −0.542 | 6.404 |
| 0.390 | −0.543 | 6.404 |
| 0.388 | −0.544 | 6.404 |
| 0.386 | −0.545 | 6.404 |
| 0.384 | −0.545 | 6.404 |
| 0.382 | −0.545 | 6.404 |
| 0.379 | −0.545 | 6.404 |
| 0.377 | −0.544 | 6.404 |
| 0.375 | −0.543 | 6.404 |
| 0.374 | −0.542 | 6.404 |
| 0.372 | −0.540 | 6.404 |
| 0.371 | −0.539 | 6.404 |
| 0.369 | −0.536 | 6.404 |
| 0.368 | −0.534 | 6.404 |

TABLE 2-continued

| | X | Y | Z |
|---|---|---|---|
| | 0.366 | −0.532 | 6.404 |
| | 0.365 | −0.529 | 6.404 |
| | 0.363 | −0.527 | 6.404 |
| | 0.362 | −0.524 | 6.404 |
| | 0.360 | −0.522 | 6.404 |
| | 0.359 | −0.520 | 6.404 |
| | 0.357 | −0.517 | 6.404 |
| | 0.356 | −0.515 | 6.404 |
| | 0.348 | −0.503 | 6.404 |
| | 0.340 | −0.491 | 6.404 |
| | 0.333 | −0.479 | 6.404 |
| | 0.325 | −0.468 | 6.404 |
| | 0.318 | −0.456 | 6.404 |
| | 0.310 | −0.444 | 6.404 |
| | 0.303 | −0.432 | 6.404 |
| | 0.295 | −0.420 | 6.404 |
| | 0.287 | −0.408 | 6.404 |
| | 0.280 | −0.397 | 6.404 |
| | 0.272 | −0.385 | 6.404 |
| | 0.264 | −0.373 | 6.404 |
| | 0.257 | −0.361 | 6.404 |
| | 0.249 | −0.349 | 6.404 |
| | 0.241 | −0.338 | 6.404 |
| | 0.234 | −0.326 | 6.404 |
| | 0.226 | −0.314 | 6.404 |
| | 0.218 | −0.303 | 6.404 |
| | 0.210 | −0.291 | 6.404 |
| | 0.203 | −0.279 | 6.404 |
| | 0.195 | −0.267 | 6.404 |
| | 0.187 | −0.256 | 6.404 |
| | 0.179 | −0.244 | 6.404 |
| | 0.171 | −0.232 | 6.404 |
| | 0.163 | −0.221 | 6.404 |
| | 0.155 | −0.209 | 6.404 |
| | 0.147 | −0.198 | 6.404 |
| | 0.139 | −0.186 | 6.404 |
| | 0.131 | −0.175 | 6.404 |
| | 0.123 | −0.163 | 6.404 |
| | 0.115 | −0.152 | 6.404 |
| | 0.107 | −0.140 | 6.404 |
| | 0.099 | −0.129 | 6.404 |
| | 0.091 | −0.118 | 6.404 |
| | 0.082 | −0.106 | 6.404 |
| | 0.074 | −0.095 | 6.404 |
| | 0.065 | −0.084 | 6.404 |
| | 0.057 | −0.072 | 6.404 |
| | 0.048 | −0.061 | 6.404 |
| | 0.040 | −0.050 | 6.404 |
| | 0.031 | −0.039 | 6.404 |
| | 0.022 | −0.028 | 6.404 |
| | 0.014 | −0.017 | 6.404 |
| | 0.005 | −0.006 | 6.404 |
| | −0.004 | 0.005 | 6.404 |
| | −0.013 | 0.015 | 6.404 |
| | −0.022 | 0.026 | 6.404 |
| | −0.032 | 0.037 | 6.404 |
| | −0.041 | 0.047 | 6.404 |
| | −0.050 | 0.058 | 6.404 |
| | −0.060 | 0.068 | 6.404 |
| | −0.069 | 0.078 | 6.404 |
| | −0.079 | 0.088 | 6.404 |
| | −0.089 | 0.098 | 6.404 |
| | −0.099 | 0.108 | 6.404 |
| | −0.109 | 0.118 | 6.404 |
| | −0.119 | 0.128 | 6.404 |
| | −0.130 | 0.137 | 6.404 |
| | −0.140 | 0.146 | 6.404 |
| | −0.151 | 0.156 | 6.404 |
| | −0.162 | 0.164 | 6.404 |
| | −0.173 | 0.173 | 6.404 |
| | −0.184 | 0.182 | 6.404 |
| | −0.195 | 0.190 | 6.404 |
| | −0.207 | 0.198 | 6.404 |
| | −0.219 | 0.206 | 6.404 |
| | −0.231 | 0.213 | 6.404 |
| | −0.243 | 0.220 | 6.404 |
| | −0.255 | 0.227 | 6.404 |

TABLE 2-continued

| | X | Y | Z |
|---|---|---|---|
| | −0.268 | 0.233 | 6.404 |
| | −0.281 | 0.239 | 6.404 |
| | −0.294 | 0.244 | 6.404 |
| | −0.307 | 0.249 | 6.404 |
| | −0.320 | 0.253 | 6.404 |
| | −0.334 | 0.257 | 6.404 |
| | −0.347 | 0.261 | 6.404 |
| | −0.361 | 0.263 | 6.404 |
| | −0.375 | 0.266 | 6.404 |
| | −0.389 | 0.267 | 6.404 |
| | −0.392 | 0.267 | 6.404 |
| | −0.394 | 0.268 | 6.404 |
| | −0.397 | 0.268 | 6.404 |
| | −0.400 | 0.268 | 6.404 |
| | −0.403 | 0.268 | 6.404 |
| | −0.406 | 0.268 | 6.404 |
| | −0.408 | 0.268 | 6.404 |
| | −0.411 | 0.268 | 6.404 |
| | −0.414 | 0.268 | 6.404 |
| | −0.417 | 0.268 | 6.404 |
| | −0.423 | 0.269 | 6.404 |
| | −0.430 | 0.270 | 6.404 |
| | −0.436 | 0.271 | 6.404 |
| | −0.443 | 0.273 | 6.404 |
| | −0.448 | 0.276 | 6.404 |
| | −0.454 | 0.280 | 6.404 |
| | −0.459 | 0.284 | 6.404 |
| | −0.464 | 0.288 | 6.404 |
| | −0.468 | 0.294 | 6.404 |
| | −0.471 | 0.299 | 6.404 |
| | −0.473 | 0.306 | 6.404 |
| | −0.475 | 0.312 | 6.404 |
| | −0.475 | 0.318 | 6.404 |
| | −0.475 | 0.325 | 6.404 |
| | −0.475 | 0.332 | 6.404 |
| | −0.473 | 0.338 | 6.404 |
| | −0.471 | 0.344 | 6.404 |
| | −0.468 | 0.350 | 6.404 |
| SECTION 6 | −0.458 | 0.381 | 6.529 |
| | −0.456 | 0.383 | 6.529 |
| | −0.454 | 0.386 | 6.529 |
| | −0.452 | 0.389 | 6.529 |
| | −0.449 | 0.391 | 6.529 |
| | −0.447 | 0.394 | 6.529 |
| | −0.445 | 0.397 | 6.529 |
| | −0.443 | 0.399 | 6.529 |
| | −0.440 | 0.402 | 6.529 |
| | −0.438 | 0.404 | 6.529 |
| | −0.435 | 0.406 | 6.529 |
| | −0.422 | 0.417 | 6.529 |
| | −0.407 | 0.426 | 6.529 |
| | −0.392 | 0.434 | 6.529 |
| | −0.376 | 0.440 | 6.529 |
| | −0.360 | 0.445 | 6.529 |
| | −0.343 | 0.448 | 6.529 |
| | −0.326 | 0.450 | 6.529 |
| | −0.309 | 0.451 | 6.529 |
| | −0.292 | 0.450 | 6.529 |
| | −0.275 | 0.448 | 6.529 |
| | −0.258 | 0.444 | 6.529 |
| | −0.241 | 0.440 | 6.529 |
| | −0.225 | 0.435 | 6.529 |
| | −0.209 | 0.428 | 6.529 |
| | −0.194 | 0.421 | 6.529 |
| | −0.178 | 0.413 | 6.529 |
| | −0.164 | 0.405 | 6.529 |
| | −0.149 | 0.396 | 6.529 |
| | −0.135 | 0.386 | 6.529 |
| | −0.122 | 0.376 | 6.529 |
| | −0.108 | 0.365 | 6.529 |
| | −0.095 | 0.354 | 6.529 |
| | −0.083 | 0.342 | 6.529 |
| | −0.070 | 0.330 | 6.529 |
| | −0.058 | 0.318 | 6.529 |
| | −0.047 | 0.305 | 6.529 |
| | −0.035 | 0.293 | 6.529 |
| | −0.024 | 0.280 | 6.529 |

TABLE 2-continued

| X | Y | Z |
|---|---|---|
| −0.013 | 0.267 | 6.529 |
| −0.002 | 0.253 | 6.529 |
| 0.008 | 0.240 | 6.529 |
| 0.019 | 0.226 | 6.529 |
| 0.029 | 0.212 | 6.529 |
| 0.039 | 0.199 | 6.529 |
| 0.049 | 0.185 | 6.529 |
| 0.059 | 0.170 | 6.529 |
| 0.068 | 0.156 | 6.529 |
| 0.078 | 0.142 | 6.529 |
| 0.087 | 0.128 | 6.529 |
| 0.096 | 0.113 | 6.529 |
| 0.106 | 0.099 | 6.529 |
| 0.115 | 0.084 | 6.529 |
| 0.124 | 0.070 | 6.529 |
| 0.132 | 0.055 | 6.529 |
| 0.141 | 0.040 | 6.529 |
| 0.150 | 0.025 | 6.529 |
| 0.158 | 0.011 | 6.529 |
| 0.166 | −0.004 | 6.529 |
| 0.175 | −0.019 | 6.529 |
| 0.183 | −0.034 | 6.529 |
| 0.191 | −0.050 | 6.529 |
| 0.199 | −0.065 | 6.529 |
| 0.206 | −0.080 | 6.529 |
| 0.214 | −0.095 | 6.529 |
| 0.221 | −0.111 | 6.529 |
| 0.229 | −0.126 | 6.529 |
| 0.236 | −0.142 | 6.529 |
| 0.244 | −0.157 | 6.529 |
| 0.251 | −0.173 | 6.529 |
| 0.258 | −0.188 | 6.529 |
| 0.265 | −0.204 | 6.529 |
| 0.272 | −0.220 | 6.529 |
| 0.279 | −0.235 | 6.529 |
| 0.285 | −0.251 | 6.529 |
| 0.292 | −0.267 | 6.529 |
| 0.299 | −0.283 | 6.529 |
| 0.305 | −0.298 | 6.529 |
| 0.312 | −0.314 | 6.529 |
| 0.318 | −0.330 | 6.529 |
| 0.324 | −0.346 | 6.529 |
| 0.330 | −0.362 | 6.529 |
| 0.337 | −0.378 | 6.529 |
| 0.343 | −0.394 | 6.529 |
| 0.349 | −0.410 | 6.529 |
| 0.355 | −0.426 | 6.529 |
| 0.361 | −0.442 | 6.529 |
| 0.367 | −0.458 | 6.529 |
| 0.373 | −0.474 | 6.529 |
| 0.379 | −0.490 | 6.529 |
| 0.380 | −0.493 | 6.529 |
| 0.381 | −0.497 | 6.529 |
| 0.382 | −0.500 | 6.529 |
| 0.384 | −0.503 | 6.529 |
| 0.385 | −0.506 | 6.529 |
| 0.386 | −0.509 | 6.529 |
| 0.387 | −0.513 | 6.529 |
| 0.388 | −0.516 | 6.529 |
| 0.390 | −0.519 | 6.529 |
| 0.391 | −0.522 | 6.529 |
| 0.391 | −0.524 | 6.529 |
| 0.392 | −0.527 | 6.529 |
| 0.392 | −0.529 | 6.529 |
| 0.391 | −0.531 | 6.529 |
| 0.390 | −0.533 | 6.529 |
| 0.389 | −0.535 | 6.529 |
| 0.388 | −0.537 | 6.529 |
| 0.386 | −0.538 | 6.529 |
| 0.385 | −0.539 | 6.529 |
| 0.383 | −0.540 | 6.529 |
| 0.381 | −0.541 | 6.529 |
| 0.379 | −0.541 | 6.529 |
| 0.376 | −0.541 | 6.529 |
| 0.374 | −0.541 | 6.529 |
| 0.372 | −0.540 | 6.529 |
| 0.370 | −0.539 | 6.529 |

TABLE 2-continued

| X | Y | Z |
|---|---|---|
| 0.368 | −0.538 | 6.529 |
| 0.367 | −0.537 | 6.529 |
| 0.366 | −0.535 | 6.529 |
| 0.364 | −0.532 | 6.529 |
| 0.363 | −0.530 | 6.529 |
| 0.361 | −0.528 | 6.529 |
| 0.360 | −0.525 | 6.529 |
| 0.358 | −0.523 | 6.529 |
| 0.357 | −0.520 | 6.529 |
| 0.355 | −0.518 | 6.529 |
| 0.354 | −0.516 | 6.529 |
| 0.352 | −0.513 | 6.529 |
| 0.351 | −0.511 | 6.529 |
| 0.343 | −0.499 | 6.529 |
| 0.335 | −0.487 | 6.529 |
| 0.328 | −0.475 | 6.529 |
| 0.320 | −0.463 | 6.529 |
| 0.313 | −0.451 | 6.529 |
| 0.305 | −0.439 | 6.529 |
| 0.297 | −0.427 | 6.529 |
| 0.290 | −0.415 | 6.529 |
| 0.282 | −0.403 | 6.529 |
| 0.275 | −0.391 | 6.529 |
| 0.267 | −0.380 | 6.529 |
| 0.259 | −0.368 | 6.529 |
| 0.252 | −0.356 | 6.529 |
| 0.244 | −0.344 | 6.529 |
| 0.237 | −0.332 | 6.529 |
| 0.229 | −0.320 | 6.529 |
| 0.221 | −0.308 | 6.529 |
| 0.214 | −0.296 | 6.529 |
| 0.206 | −0.284 | 6.529 |
| 0.198 | −0.272 | 6.529 |
| 0.190 | −0.261 | 6.529 |
| 0.183 | −0.249 | 6.529 |
| 0.175 | −0.237 | 6.529 |
| 0.167 | −0.225 | 6.529 |
| 0.159 | −0.213 | 6.529 |
| 0.151 | −0.202 | 6.529 |
| 0.144 | −0.190 | 6.529 |
| 0.136 | −0.178 | 6.529 |
| 0.128 | −0.166 | 6.529 |
| 0.120 | −0.155 | 6.529 |
| 0.112 | −0.143 | 6.529 |
| 0.104 | −0.131 | 6.529 |
| 0.096 | −0.120 | 6.529 |
| 0.088 | −0.108 | 6.529 |
| 0.080 | −0.096 | 6.529 |
| 0.071 | −0.085 | 6.529 |
| 0.063 | −0.073 | 6.529 |
| 0.055 | −0.062 | 6.529 |
| 0.046 | −0.050 | 6.529 |
| 0.038 | −0.039 | 6.529 |
| 0.030 | −0.028 | 6.529 |
| 0.021 | −0.016 | 6.529 |
| 0.013 | −0.005 | 6.529 |
| 0.004 | 0.006 | 6.529 |
| −0.005 | 0.017 | 6.529 |
| −0.014 | 0.028 | 6.529 |
| −0.023 | 0.039 | 6.529 |
| −0.032 | 0.050 | 6.529 |
| −0.041 | 0.061 | 6.529 |
| −0.050 | 0.072 | 6.529 |
| −0.059 | 0.082 | 6.529 |
| −0.069 | 0.093 | 6.529 |
| −0.078 | 0.103 | 6.529 |
| −0.088 | 0.114 | 6.529 |
| −0.097 | 0.124 | 6.529 |
| −0.107 | 0.134 | 6.529 |
| −0.117 | 0.144 | 6.529 |
| −0.128 | 0.154 | 6.529 |
| −0.138 | 0.164 | 6.529 |
| −0.148 | 0.173 | 6.529 |
| −0.159 | 0.182 | 6.529 |
| −0.170 | 0.191 | 6.529 |
| −0.181 | 0.200 | 6.529 |
| −0.192 | 0.209 | 6.529 |

TABLE 2-continued

| | X | Y | Z |
|---|---|---|---|
| | −0.204 | 0.217 | 6.529 |
| | −0.215 | 0.225 | 6.529 |
| | −0.227 | 0.233 | 6.529 |
| | −0.239 | 0.241 | 6.529 |
| | −0.251 | 0.248 | 6.529 |
| | −0.264 | 0.254 | 6.529 |
| | −0.277 | 0.261 | 6.529 |
| | −0.289 | 0.266 | 6.529 |
| | −0.303 | 0.272 | 6.529 |
| | −0.316 | 0.276 | 6.529 |
| | −0.329 | 0.281 | 6.529 |
| | −0.343 | 0.285 | 6.529 |
| | −0.357 | 0.288 | 6.529 |
| | −0.371 | 0.290 | 6.529 |
| | −0.385 | 0.292 | 6.529 |
| | −0.388 | 0.293 | 6.529 |
| | −0.390 | 0.293 | 6.529 |
| | −0.393 | 0.293 | 6.529 |
| | −0.396 | 0.293 | 6.529 |
| | −0.399 | 0.294 | 6.529 |
| | −0.402 | 0.294 | 6.529 |
| | −0.404 | 0.294 | 6.529 |
| | −0.407 | 0.294 | 6.529 |
| | −0.410 | 0.294 | 6.529 |
| | −0.413 | 0.294 | 6.529 |
| | −0.419 | 0.295 | 6.529 |
| | −0.426 | 0.296 | 6.529 |
| | −0.432 | 0.297 | 6.529 |
| | −0.438 | 0.300 | 6.529 |
| | −0.444 | 0.302 | 6.529 |
| | −0.449 | 0.306 | 6.529 |
| | −0.454 | 0.310 | 6.529 |
| | −0.459 | 0.315 | 6.529 |
| | −0.462 | 0.320 | 6.529 |
| | −0.465 | 0.326 | 6.529 |
| | −0.467 | 0.332 | 6.529 |
| | −0.469 | 0.338 | 6.529 |
| | −0.469 | 0.344 | 6.529 |
| | −0.469 | 0.351 | 6.529 |
| | −0.468 | 0.357 | 6.529 |
| | −0.466 | 0.363 | 6.529 |
| | −0.464 | 0.369 | 6.529 |
| | −0.461 | 0.375 | 6.529 |
| SECTION 7 | −0.451 | 0.394 | 6.654 |
| | −0.449 | 0.397 | 6.654 |
| | −0.447 | 0.400 | 6.654 |
| | −0.444 | 0.402 | 6.654 |
| | −0.442 | 0.405 | 6.654 |
| | −0.440 | 0.407 | 6.654 |
| | −0.438 | 0.410 | 6.654 |
| | −0.435 | 0.412 | 6.654 |
| | −0.433 | 0.415 | 6.654 |
| | −0.430 | 0.417 | 6.654 |
| | −0.428 | 0.419 | 6.654 |
| | −0.414 | 0.430 | 6.654 |
| | −0.400 | 0.439 | 6.654 |
| | −0.385 | 0.446 | 6.654 |
| | −0.369 | 0.452 | 6.654 |
| | −0.352 | 0.456 | 6.654 |
| | −0.336 | 0.459 | 6.654 |
| | −0.319 | 0.461 | 6.654 |
| | −0.302 | 0.461 | 6.654 |
| | −0.285 | 0.459 | 6.654 |
| | −0.268 | 0.457 | 6.654 |
| | −0.252 | 0.453 | 6.654 |
| | −0.235 | 0.448 | 6.654 |
| | −0.219 | 0.442 | 6.654 |
| | −0.204 | 0.435 | 6.654 |
| | −0.189 | 0.427 | 6.654 |
| | −0.174 | 0.419 | 6.654 |
| | −0.160 | 0.409 | 6.654 |
| | −0.146 | 0.400 | 6.654 |
| | −0.132 | 0.389 | 6.654 |
| | −0.119 | 0.378 | 6.654 |
| | −0.107 | 0.367 | 6.654 |
| | −0.094 | 0.356 | 6.654 |
| | −0.082 | 0.344 | 6.654 |

TABLE 2-continued

| X | Y | Z |
|---|---|---|
| −0.070 | 0.331 | 6.654 |
| −0.059 | 0.319 | 6.654 |
| −0.048 | 0.306 | 6.654 |
| −0.037 | 0.293 | 6.654 |
| −0.026 | 0.280 | 6.654 |
| −0.015 | 0.267 | 6.654 |
| −0.005 | 0.253 | 6.654 |
| 0.005 | 0.240 | 6.654 |
| 0.015 | 0.226 | 6.654 |
| 0.025 | 0.212 | 6.654 |
| 0.035 | 0.198 | 6.654 |
| 0.045 | 0.184 | 6.654 |
| 0.054 | 0.170 | 6.654 |
| 0.063 | 0.156 | 6.654 |
| 0.073 | 0.142 | 6.654 |
| 0.082 | 0.128 | 6.654 |
| 0.091 | 0.113 | 6.654 |
| 0.100 | 0.099 | 6.654 |
| 0.109 | 0.085 | 6.654 |
| 0.118 | 0.070 | 6.654 |
| 0.126 | 0.055 | 6.654 |
| 0.135 | 0.041 | 6.654 |
| 0.144 | 0.026 | 6.654 |
| 0.152 | 0.011 | 6.654 |
| 0.160 | −0.004 | 6.654 |
| 0.168 | −0.018 | 6.654 |
| 0.176 | −0.033 | 6.654 |
| 0.184 | −0.048 | 6.654 |
| 0.192 | −0.063 | 6.654 |
| 0.200 | −0.078 | 6.654 |
| 0.208 | −0.094 | 6.654 |
| 0.215 | −0.109 | 6.654 |
| 0.223 | −0.124 | 6.654 |
| 0.230 | −0.139 | 6.654 |
| 0.238 | −0.155 | 6.654 |
| 0.245 | −0.170 | 6.654 |
| 0.252 | −0.185 | 6.654 |
| 0.259 | −0.201 | 6.654 |
| 0.266 | −0.216 | 6.654 |
| 0.273 | −0.232 | 6.654 |
| 0.280 | −0.247 | 6.654 |
| 0.287 | −0.263 | 6.654 |
| 0.293 | −0.278 | 6.654 |
| 0.300 | −0.294 | 6.654 |
| 0.307 | −0.310 | 6.654 |
| 0.313 | −0.326 | 6.654 |
| 0.319 | −0.341 | 6.654 |
| 0.326 | −0.357 | 6.654 |
| 0.332 | −0.373 | 6.654 |
| 0.338 | −0.389 | 6.654 |
| 0.344 | −0.405 | 6.654 |
| 0.350 | −0.420 | 6.654 |
| 0.356 | −0.436 | 6.654 |
| 0.362 | −0.452 | 6.654 |
| 0.367 | −0.468 | 6.654 |
| 0.373 | −0.484 | 6.654 |
| 0.374 | −0.487 | 6.654 |
| 0.375 | −0.491 | 6.654 |
| 0.377 | −0.494 | 6.654 |
| 0.378 | −0.497 | 6.654 |
| 0.379 | −0.500 | 6.654 |
| 0.380 | −0.503 | 6.654 |
| 0.381 | −0.507 | 6.654 |
| 0.382 | −0.510 | 6.654 |
| 0.383 | −0.513 | 6.654 |
| 0.385 | −0.516 | 6.654 |
| 0.385 | −0.518 | 6.654 |
| 0.385 | −0.521 | 6.654 |
| 0.385 | −0.523 | 6.654 |
| 0.385 | −0.525 | 6.654 |
| 0.384 | −0.527 | 6.654 |
| 0.383 | −0.529 | 6.654 |
| 0.381 | −0.531 | 6.654 |
| 0.380 | −0.532 | 6.654 |
| 0.378 | −0.534 | 6.654 |
| 0.376 | −0.534 | 6.654 |
| 0.374 | −0.535 | 6.654 |

TABLE 2-continued

| X | Y | Z |
|---|---|---|
| 0.372 | −0.535 | 6.654 |
| 0.369 | −0.535 | 6.654 |
| 0.367 | −0.535 | 6.654 |
| 0.365 | −0.534 | 6.654 |
| 0.363 | −0.533 | 6.654 |
| 0.361 | −0.532 | 6.654 |
| 0.360 | −0.530 | 6.654 |
| 0.358 | −0.529 | 6.654 |
| 0.357 | −0.526 | 6.654 |
| 0.356 | −0.524 | 6.654 |
| 0.354 | −0.521 | 6.654 |
| 0.353 | −0.519 | 6.654 |
| 0.351 | −0.517 | 6.654 |
| 0.350 | −0.514 | 6.654 |
| 0.348 | −0.512 | 6.654 |
| 0.347 | −0.509 | 6.654 |
| 0.345 | −0.507 | 6.654 |
| 0.344 | −0.505 | 6.654 |
| 0.336 | −0.493 | 6.654 |
| 0.329 | −0.480 | 6.654 |
| 0.321 | −0.468 | 6.654 |
| 0.314 | −0.456 | 6.654 |
| 0.307 | −0.444 | 6.654 |
| 0.299 | −0.432 | 6.654 |
| 0.292 | −0.420 | 6.654 |
| 0.284 | −0.408 | 6.654 |
| 0.277 | −0.396 | 6.654 |
| 0.269 | −0.384 | 6.654 |
| 0.262 | −0.372 | 6.654 |
| 0.254 | −0.360 | 6.654 |
| 0.247 | −0.348 | 6.654 |
| 0.239 | −0.336 | 6.654 |
| 0.232 | −0.324 | 6.654 |
| 0.224 | −0.312 | 6.654 |
| 0.217 | −0.300 | 6.654 |
| 0.209 | −0.288 | 6.654 |
| 0.202 | −0.276 | 6.654 |
| 0.194 | −0.264 | 6.654 |
| 0.187 | −0.252 | 6.654 |
| 0.179 | −0.240 | 6.654 |
| 0.171 | −0.228 | 6.654 |
| 0.164 | −0.216 | 6.654 |
| 0.156 | −0.204 | 6.654 |
| 0.148 | −0.192 | 6.654 |
| 0.141 | −0.181 | 6.654 |
| 0.133 | −0.169 | 6.654 |
| 0.125 | −0.157 | 6.654 |
| 0.117 | −0.145 | 6.654 |
| 0.110 | −0.133 | 6.654 |
| 0.102 | −0.121 | 6.654 |
| 0.094 | −0.110 | 6.654 |
| 0.086 | −0.098 | 6.654 |
| 0.078 | −0.086 | 6.654 |
| 0.070 | −0.075 | 6.654 |
| 0.062 | −0.063 | 6.654 |
| 0.054 | −0.052 | 6.654 |
| 0.045 | −0.040 | 6.654 |
| 0.037 | −0.029 | 6.654 |
| 0.029 | −0.017 | 6.654 |
| 0.020 | −0.006 | 6.654 |
| 0.012 | 0.006 | 6.654 |
| 0.003 | 0.017 | 6.654 |
| −0.005 | 0.028 | 6.654 |
| −0.014 | 0.039 | 6.654 |
| −0.023 | 0.050 | 6.654 |
| −0.032 | 0.061 | 6.654 |
| −0.041 | 0.072 | 6.654 |
| −0.050 | 0.083 | 6.654 |
| −0.059 | 0.094 | 6.654 |
| −0.069 | 0.105 | 6.654 |
| −0.078 | 0.115 | 6.654 |
| −0.088 | 0.126 | 6.654 |
| −0.097 | 0.136 | 6.654 |
| −0.107 | 0.146 | 6.654 |
| −0.117 | 0.156 | 6.654 |
| −0.127 | 0.166 | 6.654 |
| −0.138 | 0.176 | 6.654 |

TABLE 2-continued

| | X | Y | Z |
|---|---|---|---|
| | −0.148 | 0.185 | 6.654 |
| | −0.159 | 0.195 | 6.654 |
| | −0.169 | 0.204 | 6.654 |
| | −0.180 | 0.213 | 6.654 |
| | −0.192 | 0.221 | 6.654 |
| | −0.203 | 0.230 | 6.654 |
| | −0.215 | 0.238 | 6.654 |
| | −0.226 | 0.246 | 6.654 |
| | −0.238 | 0.253 | 6.654 |
| | −0.251 | 0.260 | 6.654 |
| | −0.263 | 0.267 | 6.654 |
| | −0.276 | 0.274 | 6.654 |
| | −0.289 | 0.280 | 6.654 |
| | −0.302 | 0.285 | 6.654 |
| | −0.315 | 0.290 | 6.654 |
| | −0.328 | 0.295 | 6.654 |
| | −0.342 | 0.299 | 6.654 |
| | −0.355 | 0.302 | 6.654 |
| | −0.369 | 0.305 | 6.654 |
| | −0.383 | 0.308 | 6.654 |
| | −0.386 | 0.308 | 6.654 |
| | −0.389 | 0.309 | 6.654 |
| | −0.392 | 0.309 | 6.654 |
| | −0.394 | 0.310 | 6.654 |
| | −0.397 | 0.310 | 6.654 |
| | −0.400 | 0.310 | 6.654 |
| | −0.403 | 0.310 | 6.654 |
| | −0.406 | 0.311 | 6.654 |
| | −0.408 | 0.311 | 6.654 |
| | −0.411 | 0.311 | 6.654 |
| | −0.417 | 0.312 | 6.654 |
| | −0.423 | 0.313 | 6.654 |
| | −0.429 | 0.315 | 6.654 |
| | −0.435 | 0.317 | 6.654 |
| | −0.440 | 0.320 | 6.654 |
| | −0.446 | 0.323 | 6.654 |
| | −0.450 | 0.327 | 6.654 |
| | −0.454 | 0.332 | 6.654 |
| | −0.458 | 0.337 | 6.654 |
| | −0.460 | 0.342 | 6.654 |
| | −0.462 | 0.348 | 6.654 |
| | −0.463 | 0.354 | 6.654 |
| | −0.463 | 0.360 | 6.654 |
| | −0.463 | 0.367 | 6.654 |
| | −0.462 | 0.373 | 6.654 |
| | −0.460 | 0.378 | 6.654 |
| | −0.457 | 0.384 | 6.654 |
| | −0.454 | 0.389 | 6.654 |
| SECTION 8 | −0.444 | 0.400 | 6.779 |
| | −0.442 | 0.403 | 6.779 |
| | −0.440 | 0.405 | 6.779 |
| | −0.438 | 0.408 | 6.779 |
| | −0.435 | 0.410 | 6.779 |
| | −0.433 | 0.413 | 6.779 |
| | −0.431 | 0.415 | 6.779 |
| | −0.428 | 0.417 | 6.779 |
| | −0.426 | 0.420 | 6.779 |
| | −0.423 | 0.422 | 6.779 |
| | −0.421 | 0.424 | 6.779 |
| | −0.408 | 0.434 | 6.779 |
| | −0.393 | 0.443 | 6.779 |
| | −0.378 | 0.451 | 6.779 |
| | −0.363 | 0.457 | 6.779 |
| | −0.346 | 0.461 | 6.779 |
| | −0.330 | 0.464 | 6.779 |
| | −0.313 | 0.465 | 6.779 |
| | −0.296 | 0.465 | 6.779 |
| | −0.280 | 0.464 | 6.779 |
| | −0.263 | 0.461 | 6.779 |
| | −0.247 | 0.457 | 6.779 |
| | −0.231 | 0.452 | 6.779 |
| | −0.215 | 0.445 | 6.779 |
| | −0.200 | 0.438 | 6.779 |
| | −0.185 | 0.430 | 6.779 |
| | −0.171 | 0.421 | 6.779 |
| | −0.157 | 0.411 | 6.779 |
| | −0.144 | 0.401 | 6.779 |

TABLE 2-continued

| X | Y | Z |
|---|---|---|
| −0.131 | 0.390 | 6.779 |
| −0.118 | 0.379 | 6.779 |
| −0.106 | 0.368 | 6.779 |
| −0.094 | 0.356 | 6.779 |
| −0.083 | 0.344 | 6.779 |
| −0.071 | 0.331 | 6.779 |
| −0.060 | 0.319 | 6.779 |
| −0.049 | 0.306 | 6.779 |
| −0.039 | 0.293 | 6.779 |
| −0.029 | 0.280 | 6.779 |
| −0.018 | 0.266 | 6.779 |
| −0.008 | 0.253 | 6.779 |
| 0.002 | 0.239 | 6.779 |
| 0.011 | 0.226 | 6.779 |
| 0.021 | 0.212 | 6.779 |
| 0.030 | 0.198 | 6.779 |
| 0.040 | 0.184 | 6.779 |
| 0.049 | 0.170 | 6.779 |
| 0.058 | 0.156 | 6.779 |
| 0.068 | 0.142 | 6.779 |
| 0.077 | 0.128 | 6.779 |
| 0.086 | 0.113 | 6.779 |
| 0.094 | 0.099 | 6.779 |
| 0.103 | 0.085 | 6.779 |
| 0.112 | 0.071 | 6.779 |
| 0.120 | 0.056 | 6.779 |
| 0.129 | 0.042 | 6.779 |
| 0.137 | 0.027 | 6.779 |
| 0.146 | 0.013 | 6.779 |
| 0.154 | −0.002 | 6.779 |
| 0.162 | −0.017 | 6.779 |
| 0.170 | −0.031 | 6.779 |
| 0.179 | −0.046 | 6.779 |
| 0.186 | −0.061 | 6.779 |
| 0.194 | −0.076 | 6.779 |
| 0.202 | −0.091 | 6.779 |
| 0.210 | −0.106 | 6.779 |
| 0.218 | −0.121 | 6.779 |
| 0.225 | −0.136 | 6.779 |
| 0.233 | −0.151 | 6.779 |
| 0.240 | −0.166 | 6.779 |
| 0.247 | −0.181 | 6.779 |
| 0.254 | −0.196 | 6.779 |
| 0.262 | −0.211 | 6.779 |
| 0.269 | −0.227 | 6.779 |
| 0.276 | −0.242 | 6.779 |
| 0.282 | −0.257 | 6.779 |
| 0.289 | −0.273 | 6.779 |
| 0.296 | −0.288 | 6.779 |
| 0.302 | −0.303 | 6.779 |
| 0.309 | −0.319 | 6.779 |
| 0.315 | −0.335 | 6.779 |
| 0.321 | −0.350 | 6.779 |
| 0.327 | −0.366 | 6.779 |
| 0.333 | −0.382 | 6.779 |
| 0.339 | −0.397 | 6.779 |
| 0.345 | −0.413 | 6.779 |
| 0.351 | −0.429 | 6.779 |
| 0.356 | −0.445 | 6.779 |
| 0.362 | −0.461 | 6.779 |
| 0.367 | −0.476 | 6.779 |
| 0.368 | −0.480 | 6.779 |
| 0.369 | −0.483 | 6.779 |
| 0.370 | −0.486 | 6.779 |
| 0.372 | −0.489 | 6.779 |
| 0.373 | −0.492 | 6.779 |
| 0.374 | −0.496 | 6.779 |
| 0.375 | −0.499 | 6.779 |
| 0.376 | −0.502 | 6.779 |
| 0.377 | −0.505 | 6.779 |
| 0.378 | −0.508 | 6.779 |
| 0.378 | −0.511 | 6.779 |
| 0.378 | −0.513 | 6.779 |
| 0.378 | −0.515 | 6.779 |
| 0.378 | −0.518 | 6.779 |
| 0.377 | −0.520 | 6.779 |
| 0.376 | −0.522 | 6.779 |

TABLE 2-continued

| X | Y | Z |
|---|---|---|
| 0.374 | −0.524 | 6.779 |
| 0.372 | −0.525 | 6.779 |
| 0.370 | −0.526 | 6.779 |
| 0.368 | −0.527 | 6.779 |
| 0.366 | −0.528 | 6.779 |
| 0.364 | −0.528 | 6.779 |
| 0.361 | −0.528 | 6.779 |
| 0.359 | −0.528 | 6.779 |
| 0.357 | −0.527 | 6.779 |
| 0.355 | −0.526 | 6.779 |
| 0.353 | −0.524 | 6.779 |
| 0.351 | −0.523 | 6.779 |
| 0.350 | −0.521 | 6.779 |
| 0.348 | −0.518 | 6.779 |
| 0.347 | −0.516 | 6.779 |
| 0.345 | −0.514 | 6.779 |
| 0.344 | −0.511 | 6.779 |
| 0.343 | −0.509 | 6.779 |
| 0.341 | −0.506 | 6.779 |
| 0.340 | −0.504 | 6.779 |
| 0.338 | −0.501 | 6.779 |
| 0.337 | −0.499 | 6.779 |
| 0.335 | −0.496 | 6.779 |
| 0.328 | −0.484 | 6.779 |
| 0.321 | −0.472 | 6.779 |
| 0.314 | −0.460 | 6.779 |
| 0.307 | −0.448 | 6.779 |
| 0.300 | −0.436 | 6.779 |
| 0.293 | −0.424 | 6.779 |
| 0.285 | −0.411 | 6.779 |
| 0.278 | −0.399 | 6.779 |
| 0.271 | −0.387 | 6.779 |
| 0.264 | −0.375 | 6.779 |
| 0.257 | −0.363 | 6.779 |
| 0.249 | −0.351 | 6.779 |
| 0.242 | −0.339 | 6.779 |
| 0.235 | −0.327 | 6.779 |
| 0.228 | −0.315 | 6.779 |
| 0.220 | −0.302 | 6.779 |
| 0.213 | −0.290 | 6.779 |
| 0.206 | −0.278 | 6.779 |
| 0.198 | −0.266 | 6.779 |
| 0.191 | −0.254 | 6.779 |
| 0.184 | −0.242 | 6.779 |
| 0.176 | −0.230 | 6.779 |
| 0.169 | −0.218 | 6.779 |
| 0.161 | −0.206 | 6.779 |
| 0.154 | −0.194 | 6.779 |
| 0.146 | −0.182 | 6.779 |
| 0.139 | −0.170 | 6.779 |
| 0.131 | −0.159 | 6.779 |
| 0.124 | −0.147 | 6.779 |
| 0.116 | −0.135 | 6.779 |
| 0.108 | −0.123 | 6.779 |
| 0.100 | −0.111 | 6.779 |
| 0.093 | −0.100 | 6.779 |
| 0.085 | −0.088 | 6.779 |
| 0.077 | −0.076 | 6.779 |
| 0.069 | −0.064 | 6.779 |
| 0.061 | −0.053 | 6.779 |
| 0.053 | −0.041 | 6.779 |
| 0.045 | −0.030 | 6.779 |
| 0.036 | −0.018 | 6.779 |
| 0.028 | −0.007 | 6.779 |
| 0.020 | 0.004 | 6.779 |
| 0.011 | 0.016 | 6.779 |
| 0.003 | 0.027 | 6.779 |
| −0.006 | 0.038 | 6.779 |
| −0.015 | 0.049 | 6.779 |
| −0.023 | 0.060 | 6.779 |
| −0.032 | 0.071 | 6.779 |
| −0.041 | 0.082 | 6.779 |
| −0.051 | 0.093 | 6.779 |
| −0.060 | 0.103 | 6.779 |
| −0.069 | 0.114 | 6.779 |
| −0.079 | 0.124 | 6.779 |
| −0.088 | 0.134 | 6.779 |

TABLE 2-continued

| | X | Y | Z |
|---|---|---|---|
| | −0.098 | 0.145 | 6.779 |
| | −0.108 | 0.155 | 6.779 |
| | −0.118 | 0.164 | 6.779 |
| | −0.128 | 0.174 | 6.779 |
| | −0.139 | 0.184 | 6.779 |
| | −0.149 | 0.193 | 6.779 |
| | −0.160 | 0.202 | 6.779 |
| | −0.171 | 0.211 | 6.779 |
| | −0.182 | 0.220 | 6.779 |
| | −0.193 | 0.228 | 6.779 |
| | −0.205 | 0.237 | 6.779 |
| | −0.216 | 0.245 | 6.779 |
| | −0.228 | 0.252 | 6.779 |
| | −0.240 | 0.260 | 6.779 |
| | −0.252 | 0.267 | 6.779 |
| | −0.265 | 0.274 | 6.779 |
| | −0.277 | 0.280 | 6.779 |
| | −0.290 | 0.286 | 6.779 |
| | −0.303 | 0.292 | 6.779 |
| | −0.316 | 0.297 | 6.779 |
| | −0.329 | 0.302 | 6.779 |
| | −0.343 | 0.306 | 6.779 |
| | −0.356 | 0.310 | 6.779 |
| | −0.370 | 0.314 | 6.779 |
| | −0.384 | 0.317 | 6.779 |
| | −0.386 | 0.317 | 6.779 |
| | −0.389 | 0.318 | 6.779 |
| | −0.392 | 0.318 | 6.779 |
| | −0.395 | 0.319 | 6.779 |
| | −0.398 | 0.319 | 6.779 |
| | −0.400 | 0.320 | 6.779 |
| | −0.403 | 0.320 | 6.779 |
| | −0.406 | 0.320 | 6.779 |
| | −0.409 | 0.321 | 6.779 |
| | −0.411 | 0.321 | 6.779 |
| | −0.417 | 0.322 | 6.779 |
| | −0.423 | 0.323 | 6.779 |
| | −0.428 | 0.325 | 6.779 |
| | −0.433 | 0.328 | 6.779 |
| | −0.438 | 0.330 | 6.779 |
| | −0.443 | 0.334 | 6.779 |
| | −0.447 | 0.338 | 6.779 |
| | −0.450 | 0.342 | 6.779 |
| | −0.453 | 0.347 | 6.779 |
| | −0.456 | 0.352 | 6.779 |
| | −0.457 | 0.358 | 6.779 |
| | −0.458 | 0.363 | 6.779 |
| | −0.457 | 0.369 | 6.779 |
| | −0.457 | 0.375 | 6.779 |
| | −0.455 | 0.380 | 6.779 |
| | −0.453 | 0.386 | 6.779 |
| | −0.451 | 0.391 | 6.779 |
| | −0.448 | 0.395 | 6.779 |
| SECTION 9 | −0.433 | 0.396 | 6.994 |
| | −0.431 | 0.399 | 6.994 |
| | −0.429 | 0.401 | 6.994 |
| | −0.426 | 0.403 | 6.994 |
| | −0.424 | 0.406 | 6.994 |
| | −0.422 | 0.408 | 6.994 |
| | −0.419 | 0.410 | 6.994 |
| | −0.417 | 0.413 | 6.994 |
| | −0.415 | 0.415 | 6.994 |
| | −0.412 | 0.417 | 6.994 |
| | −0.410 | 0.419 | 6.994 |
| | −0.397 | 0.429 | 6.994 |
| | −0.383 | 0.438 | 6.994 |
| | −0.369 | 0.446 | 6.994 |
| | −0.354 | 0.453 | 6.994 |
| | −0.338 | 0.458 | 6.994 |
| | −0.322 | 0.462 | 6.994 |
| | −0.306 | 0.464 | 6.994 |
| | −0.290 | 0.465 | 6.994 |
| | −0.273 | 0.464 | 6.994 |
| | −0.257 | 0.461 | 6.994 |
| | −0.241 | 0.457 | 6.994 |
| | −0.226 | 0.452 | 6.994 |
| | −0.211 | 0.445 | 6.994 |

TABLE 2-continued

| X | Y | Z |
|---|---|---|
| −0.196 | 0.437 | 6.994 |
| −0.182 | 0.429 | 6.994 |
| −0.168 | 0.420 | 6.994 |
| −0.155 | 0.410 | 6.994 |
| −0.143 | 0.399 | 6.994 |
| −0.130 | 0.389 | 6.994 |
| −0.118 | 0.377 | 6.994 |
| −0.107 | 0.365 | 6.994 |
| −0.096 | 0.353 | 6.994 |
| −0.085 | 0.341 | 6.994 |
| −0.074 | 0.329 | 6.994 |
| −0.064 | 0.316 | 6.994 |
| −0.054 | 0.303 | 6.994 |
| −0.044 | 0.290 | 6.994 |
| −0.034 | 0.277 | 6.994 |
| −0.024 | 0.263 | 6.994 |
| −0.015 | 0.250 | 6.994 |
| −0.005 | 0.237 | 6.994 |
| 0.004 | 0.223 | 6.994 |
| 0.013 | 0.209 | 6.994 |
| 0.022 | 0.196 | 6.994 |
| 0.031 | 0.182 | 6.994 |
| 0.040 | 0.168 | 6.994 |
| 0.049 | 0.155 | 6.994 |
| 0.058 | 0.141 | 6.994 |
| 0.067 | 0.127 | 6.994 |
| 0.076 | 0.113 | 6.994 |
| 0.085 | 0.099 | 6.994 |
| 0.093 | 0.085 | 6.994 |
| 0.102 | 0.071 | 6.994 |
| 0.110 | 0.057 | 6.994 |
| 0.119 | 0.043 | 6.994 |
| 0.127 | 0.029 | 6.994 |
| 0.136 | 0.015 | 6.994 |
| 0.144 | 0.001 | 6.994 |
| 0.153 | −0.013 | 6.994 |
| 0.161 | −0.027 | 6.994 |
| 0.169 | −0.042 | 6.994 |
| 0.177 | −0.056 | 6.994 |
| 0.185 | −0.070 | 6.994 |
| 0.193 | −0.084 | 6.994 |
| 0.201 | −0.099 | 6.994 |
| 0.209 | −0.113 | 6.994 |
| 0.217 | −0.128 | 6.994 |
| 0.225 | −0.142 | 6.994 |
| 0.232 | −0.157 | 6.994 |
| 0.240 | −0.171 | 6.994 |
| 0.247 | −0.186 | 6.994 |
| 0.255 | −0.201 | 6.994 |
| 0.262 | −0.215 | 6.994 |
| 0.269 | −0.230 | 6.994 |
| 0.276 | −0.245 | 6.994 |
| 0.283 | −0.260 | 6.994 |
| 0.290 | −0.275 | 6.994 |
| 0.296 | −0.290 | 6.994 |
| 0.303 | −0.305 | 6.994 |
| 0.309 | −0.320 | 6.994 |
| 0.315 | −0.335 | 6.994 |
| 0.321 | −0.351 | 6.994 |
| 0.327 | −0.366 | 6.994 |
| 0.332 | −0.382 | 6.994 |
| 0.338 | −0.397 | 6.994 |
| 0.343 | −0.413 | 6.994 |
| 0.348 | −0.428 | 6.994 |
| 0.352 | −0.444 | 6.994 |
| 0.357 | −0.460 | 6.994 |
| 0.358 | −0.463 | 6.994 |
| 0.359 | −0.466 | 6.994 |
| 0.359 | −0.469 | 6.994 |
| 0.360 | −0.473 | 6.994 |
| 0.361 | −0.476 | 6.994 |
| 0.362 | −0.479 | 6.994 |
| 0.363 | −0.482 | 6.994 |
| 0.363 | −0.485 | 6.994 |
| 0.364 | −0.489 | 6.994 |
| 0.365 | −0.492 | 6.994 |
| 0.366 | −0.494 | 6.994 |

TABLE 2-continued

| X | Y | Z |
|---|---|---|
| 0.366 | −0.497 | 6.994 |
| 0.365 | −0.500 | 6.994 |
| 0.364 | −0.503 | 6.994 |
| 0.363 | −0.505 | 6.994 |
| 0.362 | −0.507 | 6.994 |
| 0.360 | −0.509 | 6.994 |
| 0.358 | −0.511 | 6.994 |
| 0.355 | −0.512 | 6.994 |
| 0.353 | −0.513 | 6.994 |
| 0.350 | −0.514 | 6.994 |
| 0.347 | −0.514 | 6.994 |
| 0.345 | −0.514 | 6.994 |
| 0.342 | −0.513 | 6.994 |
| 0.339 | −0.512 | 6.994 |
| 0.337 | −0.511 | 6.994 |
| 0.335 | −0.509 | 6.994 |
| 0.333 | −0.507 | 6.994 |
| 0.332 | −0.504 | 6.994 |
| 0.330 | −0.502 | 6.994 |
| 0.329 | −0.499 | 6.994 |
| 0.328 | −0.497 | 6.994 |
| 0.327 | −0.495 | 6.994 |
| 0.325 | −0.492 | 6.994 |
| 0.324 | −0.490 | 6.994 |
| 0.323 | −0.487 | 6.994 |
| 0.321 | −0.485 | 6.994 |
| 0.320 | −0.482 | 6.994 |
| 0.319 | −0.480 | 6.994 |
| 0.313 | −0.467 | 6.994 |
| 0.306 | −0.455 | 6.994 |
| 0.300 | −0.443 | 6.994 |
| 0.293 | −0.430 | 6.994 |
| 0.287 | −0.418 | 6.994 |
| 0.280 | −0.406 | 6.994 |
| 0.274 | −0.394 | 6.994 |
| 0.267 | −0.381 | 6.994 |
| 0.261 | −0.369 | 6.994 |
| 0.254 | −0.357 | 6.994 |
| 0.247 | −0.345 | 6.994 |
| 0.241 | −0.332 | 6.994 |
| 0.234 | −0.320 | 6.994 |
| 0.227 | −0.308 | 6.994 |
| 0.221 | −0.296 | 6.994 |
| 0.214 | −0.284 | 6.994 |
| 0.207 | −0.272 | 6.994 |
| 0.200 | −0.259 | 6.994 |
| 0.193 | −0.247 | 6.994 |
| 0.187 | −0.235 | 6.994 |
| 0.180 | −0.223 | 6.994 |
| 0.173 | −0.211 | 6.994 |
| 0.166 | −0.199 | 6.994 |
| 0.159 | −0.187 | 6.994 |
| 0.151 | −0.175 | 6.994 |
| 0.144 | −0.163 | 6.994 |
| 0.137 | −0.152 | 6.994 |
| 0.130 | −0.140 | 6.994 |
| 0.122 | −0.128 | 6.994 |
| 0.115 | −0.116 | 6.994 |
| 0.107 | −0.104 | 6.994 |
| 0.100 | −0.093 | 6.994 |
| 0.092 | −0.081 | 6.994 |
| 0.084 | −0.070 | 6.994 |
| 0.077 | −0.058 | 6.994 |
| 0.069 | −0.047 | 6.994 |
| 0.061 | −0.035 | 6.994 |
| 0.053 | −0.024 | 6.994 |
| 0.045 | −0.013 | 6.994 |
| 0.036 | −0.002 | 6.994 |
| 0.028 | 0.010 | 6.994 |
| 0.020 | 0.021 | 6.994 |
| 0.011 | 0.032 | 6.994 |
| 0.002 | 0.042 | 6.994 |
| −0.007 | 0.053 | 6.994 |
| −0.015 | 0.064 | 6.994 |
| −0.025 | 0.074 | 6.994 |
| −0.034 | 0.085 | 6.994 |
| −0.043 | 0.095 | 6.994 |

TABLE 2-continued

| X | Y | Z |
|---|---|---|
| −0.052 | 0.105 | 6.994 |
| −0.062 | 0.115 | 6.994 |
| −0.072 | 0.125 | 6.994 |
| −0.082 | 0.135 | 6.994 |
| −0.092 | 0.145 | 6.994 |
| −0.102 | 0.154 | 6.994 |
| −0.112 | 0.164 | 6.994 |
| −0.122 | 0.173 | 6.994 |
| −0.133 | 0.182 | 6.994 |
| −0.144 | 0.191 | 6.994 |
| −0.155 | 0.199 | 6.994 |
| −0.166 | 0.208 | 6.994 |
| −0.177 | 0.216 | 6.994 |
| −0.188 | 0.224 | 6.994 |
| −0.200 | 0.232 | 6.994 |
| −0.211 | 0.239 | 6.994 |
| −0.223 | 0.247 | 6.994 |
| −0.235 | 0.254 | 6.994 |
| −0.247 | 0.261 | 6.994 |
| −0.259 | 0.267 | 6.994 |
| −0.272 | 0.274 | 6.994 |
| −0.284 | 0.280 | 6.994 |
| −0.297 | 0.286 | 6.994 |
| −0.310 | 0.291 | 6.994 |
| −0.322 | 0.297 | 6.994 |
| −0.335 | 0.302 | 6.994 |
| −0.348 | 0.307 | 6.994 |
| −0.361 | 0.311 | 6.994 |
| −0.375 | 0.316 | 6.994 |
| −0.388 | 0.320 | 6.994 |
| −0.391 | 0.320 | 6.994 |
| −0.393 | 0.321 | 6.994 |
| −0.396 | 0.322 | 6.994 |
| −0.399 | 0.323 | 6.994 |
| −0.401 | 0.324 | 6.994 |
| −0.404 | 0.324 | 6.994 |
| −0.407 | 0.325 | 6.994 |
| −0.409 | 0.326 | 6.994 |
| −0.412 | 0.326 | 6.994 |
| −0.415 | 0.327 | 6.994 |
| −0.419 | 0.329 | 6.994 |
| −0.424 | 0.330 | 6.994 |
| −0.428 | 0.332 | 6.994 |
| −0.432 | 0.335 | 6.994 |
| −0.436 | 0.338 | 6.994 |
| −0.439 | 0.341 | 6.994 |
| −0.442 | 0.345 | 6.994 |
| −0.445 | 0.349 | 6.994 |
| −0.447 | 0.353 | 6.994 |
| −0.448 | 0.358 | 6.994 |
| −0.448 | 0.363 | 6.994 |
| −0.448 | 0.367 | 6.994 |
| −0.448 | 0.372 | 6.994 |
| −0.446 | 0.377 | 6.994 |
| −0.444 | 0.381 | 6.994 |
| −0.442 | 0.385 | 6.994 |
| −0.439 | 0.389 | 6.994 |
| −0.436 | 0.393 | 6.994 |

It should be understood that the finished HPT blade 42*a* does not necessarily include all the sections defined in Table 2. The tip 62 and the airfoil portion proximal the platform 64 may not be defined by a profile section 70. For example, in a particular embodiment in which the tip 62 is angled, multiple tip 62 cross-sections would not be defined by a profile section 70. Notably, it should be considered that the airfoil profile proximal to the platform 64 may vary due to several imposed constraints. However, the HPT blade 42*a* has an intermediate airfoil portion 68 defined between the platform 64 and the tip 62 thereof and which has a profile defined on the basis of at least the intermediate sections of the various blade profile sections 70 defined in Table 2.

It should be appreciated that the intermediate airfoil portion 68 of the HPT stage blade 42*a* is defined between the inner and outer gaspath walls 28 and 30, and that the wall 28 is partially defined by the blade platform. More specifically, the Z values defining the gaspath 27 in the region of the stacking line 46 fall within the range of Z=5.888 and Z=6.901 which are the z values defining the inner and outer gaspath walls 28 and 30 at the stacking line 46 (see Table 1). Therefore, the physical airfoil profile of HPT blade 42*a* includes Sections 2 to 8 of Table 2. Sections 1 and 9 are located completely outside of the boundaries set by the inner and annular outer gaspath walls 28 and 30 at the HPT blade stacking line 46, but are provided, in part, to fully define the airfoil surface and, in part, to improve curve-fitting of the airfoil at its radially distal portions. The skilled reader will appreciate that a suitable fillet radius is to be applied between the wall 28 (i.e. blade platform) and the airfoil portion 54 of the blade 42*a*, and that a suitable blade tip clearance is to be provided between tip 62 and outer wall 30.

The above description is meant to be exemplary only, and one skilled in the art will recognize that changes may be made to the embodiments described without department from the scope of the invention disclosed. For example, the airfoil and/or gaspath definitions of Tables 1 and 2 may be scaled geometrically, while maintaining the same proportional relationship and airfoil shape, for application to gas turbine engine of other sizes. Still other modifications which fall within the scope of the present invention will be apparent to those skilled in the art, in light of a review of this disclosure, and such modifications are intended to fall within the appended claims.

The invention claimed is:

1. A turbine blade for a gas turbine engine comprising an airfoil having an intermediate portion defined by a nominal profile substantially in accordance with Cartesian coordinate values of X, Y, and Z of Sections 2 to 8 set forth in Table 2, wherein the point of origin of the orthogonally related axes X, Y and Z is located at an intersection of a centerline of the gas turbine engine and a stacking line of the turbine blade, the Z values are radial distances measured along the stacking line, the X and Y are coordinate values defining the profile at each distance Z.

2. The turbine blade as defined in claim 1 forming part of a high pressure turbine stage of the gas turbine engine.

3. The turbine blade as defined in claim 2, wherein the blade forms part of a first stage of a two-stage high pressure turbine.

4. The turbine blade as defined in claim 1, wherein the X and Y values are scalable as a function of the same constant or number.

5. The turbine blade as defined in claim 1, wherein the airfoil has a surface and wherein the surface falls within 0.010 inch of the coordinate values.

6. The turbine blade as defined in claim 5, wherein the nominal profile defining the intermediate portion is for an uncoated airfoil, and wherein a coating having a thickness of 0.002 inch to 0.010 inch is applied to the uncoated airfoil.

7. The turbine blade as defined in claim 1, wherein X and Y values define a set of points for each Z value which when connected by smooth continuing arcs define an airfoil profile section, the profile sections at the Z distances being joined smoothly with one another to form an airfoil shape of the intermediate portion.

8. A turbine blade for a gas turbine engine comprising an airfoil having an intermediate portion at least partly defined by a nominal profile substantially in accordance with Cartesian coordinate values of X, Y, and Z of Sections 2 to 8 set forth in Table 2, wherein the point of origin of the orthogonally related axes X, Y and Z is located at an intersection of a centerline of the gas turbine engine and a stacking line of the turbine blade in the engine, the Z values are radial distances measured along the stacking line of the airfoil, the X and Y are coordinate values defining the profile at each distance Z, and wherein the X and Y values are scalable as a function of the same constant or number.

9. The turbine blade as defined in claim 8 forming part of a blade of a high pressure turbine stage of the gas turbine engine.

10. The turbine blade as defined in claim 9, wherein the blade is part of a first stage of a two-stage high pressure turbine.

11. The turbine blade as defined in claim 8, wherein the airfoil has a surface which falls within 0.010 inch of the coordinate values.

12. The turbine blade as defined in claim 11, wherein the nominal profile defining the intermediate portion is for an uncoated airfoil, and wherein a coating of 0.002 inch to 0.010 inch is applied to the uncoated airfoil.

13. The turbine blade as defined in claim 8, wherein X and Y values define a set of points for each Z value which when connected by smooth continuing arcs define an airfoil profile section, the profile sections at the Z distances being joined smoothly with one another to form an airfoil shape of the intermediate portion.

14. A turbine rotor for a gas turbine engine comprising a plurality of blades extending from a rotor disc, each blade including an airfoil having an intermediate portion defined by a nominal profile substantially in accordance with Cartesian coordinate values of X, Y, and Z of Sections 2 to 8 set forth in Table 2, wherein the point of origin of the orthogonally related axes X, Y and Z is located at an intersection of a centerline of the gas turbine engine and a stacking line of the blades, the Z values are radial distances measured along the stacking line, the X and Y are coordinate values defining the profile at each distance Z.

15. A high pressure turbine blade located at a stacking line in a gaspath, comprising an airfoil having a surface lying substantially on the points of Table 2, the airfoil extending between a platform and a tip, the platform being generally defined by the inner gaspath of Table 1, and wherein the tip is defined to provide a blade tip clearance with the outer gaspath defined in Table 1 at said stacking line.

* * * * *